US011805944B2

(12) United States Patent
Lai et al.

(10) Patent No.: US 11,805,944 B2
(45) Date of Patent: *Nov. 7, 2023

(54) TOASTER AND CONTROL SYSTEM FOR A TOASTER

(71) Applicant: CONAIR CORPORATION, Stamford, CT (US)

(72) Inventors: Kin Man Lai, New Territories (HK); Lai Man Tse, Aberdeen (HK)

(73) Assignee: CONAIR LLC, Stamford, CT (US)

(*) Notice: Subject to any disclaimer, the term of this patent is extended or adjusted under 35 U.S.C. 154(b) by 335 days.

This patent is subject to a terminal disclaimer.

(21) Appl. No.: 16/993,822

(22) Filed: Aug. 14, 2020

(65) Prior Publication Data
US 2022/0047115 A1 Feb. 17, 2022

(51) Int. Cl.
*A47J 37/08* (2006.01)
*H05B 1/02* (2006.01)
*G05D 3/12* (2006.01)
*A23L 5/10* (2016.01)
*H05B 3/20* (2006.01)

(52) U.S. Cl.
CPC ............. *A47J 37/0814* (2013.01); *A23L 5/15* (2016.08); *G05D 3/127* (2013.01); *H05B 1/0261* (2013.01); *H05B 3/20* (2013.01)

(58) Field of Classification Search
CPC .... A47J 37/0611; A47J 37/0718; A47J 37/08; A47J 37/0807; A47J 37/0814; A47J 37/0821; A47J 37/0835; A47J 37/0842; A47J 37/085; A47J 37/0857; A47J 37/0871; A47J 37/0878; H05B 1/0261; H05B 3/20; A23L 5/15; G05D 3/127

USPC ................... 99/385–387, 389–393, 401, 402
See application file for complete search history.

(56) References Cited

U.S. PATENT DOCUMENTS

| | | | |
|---|---|---|---|
| 2,036,826 | A | 4/1936 | Peters |
| 2,112,076 | A | 3/1938 | De Matteis |
| 5,193,439 | A | 3/1993 | Finesman et al. |
| 5,771,780 | A | 6/1998 | Basora et al. |
| 5,938,959 | A | 8/1999 | Wang |
| 6,481,341 | B1 | 11/2002 | Choi |
| 6,639,187 | B2 | 10/2003 | Arel et al. |

(Continued)

OTHER PUBLICATIONS

Corresponding PCT International Search Report and Written Opinion dated Dec. 10, 2021.

(Continued)

*Primary Examiner* — Hung D Nguyen
(74) *Attorney, Agent, or Firm* — Grogan, Tuccillo & Vanderleeden, LLP

(57) ABSTRACT

A toaster includes a housing having a slot for receiving a food item, a heating element associated with the slot for toasting the food item, a carriage assembly having a supporting rack movably mounted in the slot for supporting the food item within the slot, a first slider member connected to the supporting rack, and a second slider member operatively connected to the first slider member, a motor, and a driving member having a first end operatively connected to the motor and a second end received in a slot in the second slider member such that when the motor is driven to rotate the driving member, the driving member drives the supporting rack, via the first slider member and the second slider member, to slidably move within the slot.

14 Claims, 31 Drawing Sheets

(56) References Cited

U.S. PATENT DOCUMENTS

| | | | |
|---|---|---|---|
| 6,829,983 B2 * | 12/2004 | Arnedo | A47J 37/0814 99/385 |
| 6,868,775 B2 | 3/2005 | Chen | |
| 2008/0202347 A1 | 8/2008 | Chen et al. | |
| 2013/0177687 A1 | 7/2013 | Cheung | |
| 2014/0352549 A1 | 12/2014 | Upston et al. | |
| 2015/0351587 A1 | 12/2015 | Zhang et al. | |

OTHER PUBLICATIONS

Danielle Collins; "FAQ: What are Hall effect sensors and what is their role in DC motors?"; Online News Source Jan. 11, 2017; pp. 1-8; WTWH Media LLC; Cleveland, Ohio.

* cited by examiner

TOASTER AND CONTROL SYSTEM FOR A TOASTER

FIELD OF THE INVENTION

The present invention relates generally to kitchen appliances and, more particularly, to a motorized toaster and a control system a motorized toaster.

BACKGROUND OF THE INVENTION

Vertical toasters for browning and crisping a slice of bread to produce toast have long been developed and widely utilized. Such toasters typically have upwardly facing slots for receiving slices of bread therein, heating elements along the sides of the slots for toasting the slices in the slots, and a rack frame or carriage which is adapted to support the bread slice therein for toasting. The slices are movably supported in the toaster slots in such a manner that they are capable of moving between a lower toasting position and an upper operative position, wherein in the lower toasting position, the carriage is lowered to activate the toaster for toasting the slices in the carriage, and wherein in the upper operative position, the carriage is raised for manual retrieval of the toasted bread slice.

Such conventional toasters further include means for raising the carriage from the lower toasting position to the upper operative position. The raising means usually comprises a resilient element, such as a compressive spring, mounted in the toaster case and arranged to normally apply an upward urging force to the carriage in such a manner that when toasting of the bread slice in the toasting position is finished, the resilient element is arranged to apply an upwards force to the carriage for raising it from the lower toasting position back to the upper operative position.

While existing vertical toasters are suitable for what may be regarded as ordinary performance, there is a need in the art for more precise control over the toasting operation and for improvements in ease of use. For example, existing toasters may be prone to jamming and are ill-equipped to accommodate different size slices of bread, waffles, bagels, and/or other food items. In addition, there is a need for an improved control system for such a toaster.

SUMMARY OF THE INVENTION

It is an object of the present invention to provide a toaster.

It is another object of the present invention to provide a toaster having a motorized carriage assembly for raising and lowering a food item to be toaster.

It is another object of the present invention to provide a toaster having an improved control system.

These and other objects are achieved by the present invention.

According to an embodiment of the present invention, a toaster includes a housing having a slot for receiving a food item, a heating element associated with the slot for toasting the food item, a carriage assembly having a supporting rack movably mounted in the slot for supporting the food item within the slot, a first slider member connected to the supporting rack, and a second slider member operatively connected to the first slider member, a motor, and a driving member having a first end operatively connected to the motor and a second end received in a slot in the second slider member such that when the motor is driven to rotate the driving member, the driving member drives the supporting rack, via the first slider member and the second slider member, to slidably move within the slot.

According to another embodiment of the invention, a method for toasting a food item includes the steps of providing a toaster having a housing having a slot for receiving a food item, a heating element associated with the slot for toasting the food item, and a carriage assembly having a supporting rack movably mounted in the slot for supporting the food item within the slot, receiving, at a control unit, information corresponding to a size of the food item, and, in response to the information, moving the supporting rack to a predetermined vertical position within the slot.

According to yet another embodiment of the invention, a toaster includes a housing having a slot for receiving a food item, a heating element associated with the slot for toasting the food item and a carriage assembly. The carriage assembly includes a supporting rack movably mounted in the slot for supporting the food item within the slot, a first slider member connected to the supporting rack, a second slider member operatively connected to the first slider member, and a third slider member operatively connected to the first slider member. The toaster also includes a motor and a driving member having a first end operatively connected to the motor and a second end received in a slot in the second slider member such that when the motor is driven to rotate the driving member, the driving member drives the supporting rack, via the first slider member, the second slider member and the third slider member, to slidably move within the slot.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
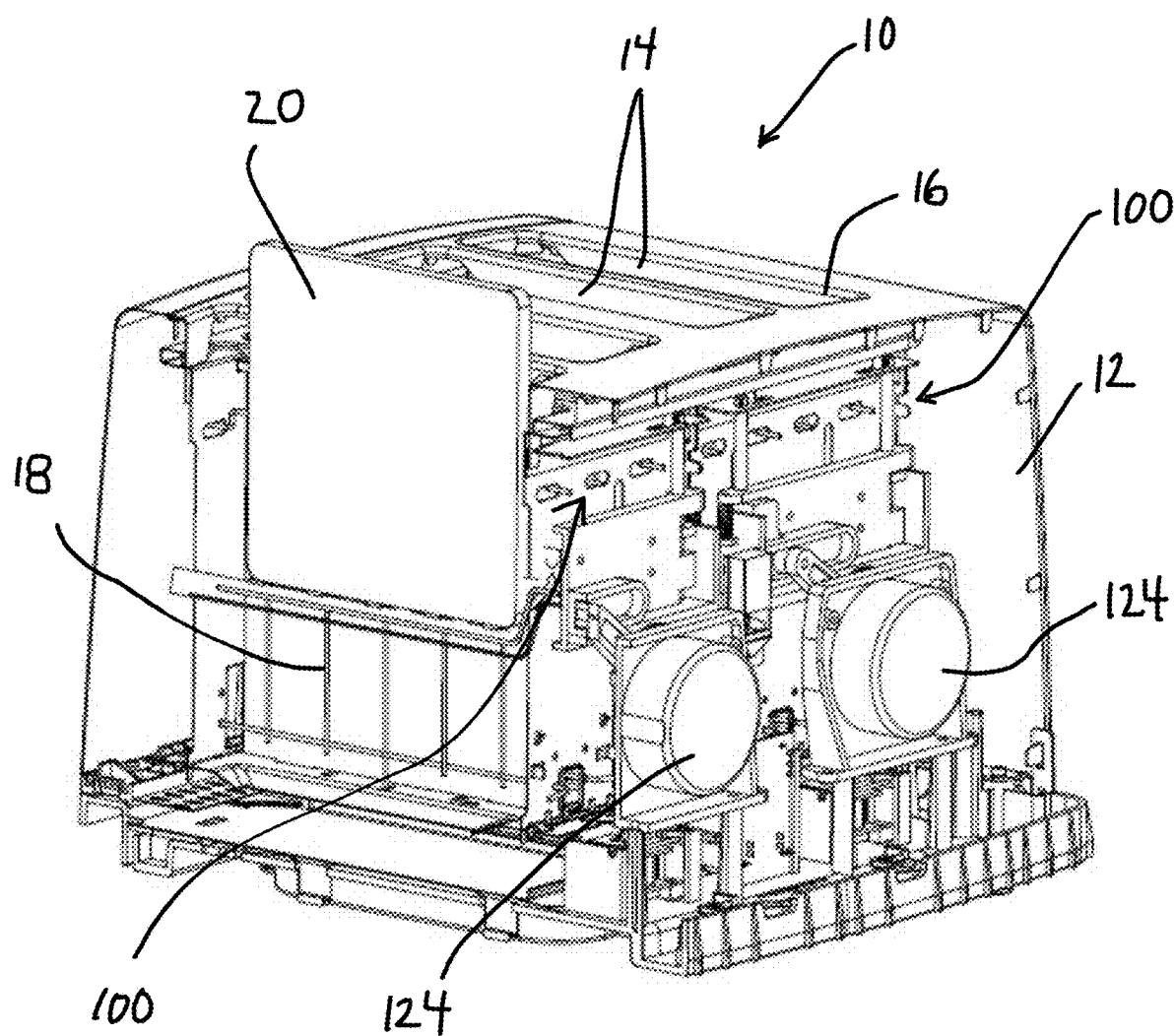
FIG. 1 is a front, perspective, partial cross-sectional view of a toaster according to an embodiment of the present invention.

Referring to FIG. 1, a toaster 10 according to an embodiment of the present invention is illustrated. The toaster 10 includes a housing 12 having at least one vertically oriented slot 14 having an upwardly-facing opening 16 for receiving a food item such as a slice of bread 20. Each slot 14 includes a heating element 18 positioned on at least one, and preferably both, opposing sides of each slot 14 for browning, heating and/or crisping a food item within the slot 14. The toaster 10 also includes a carriage assembly 100 associated with each slot 14 for supporting the food item within the slot and for selectively raising and lowering the food item within the slot 14 under control of a motor and control unit.

FIGS. 2-5 more clearly illustrate the configuration of the carriage assembly 100. The carriage assembly 100 includes a bread supporting rack 102 mounted in the toaster slot 14 in a vertically movable manner. The supporting rack 102 is configured to support a food item such as a slice of bread, and to raise and lower the slice of bread within the slot 14 under control of the control unit, as discussed in detail below. As shown therein, the carriage assembly 100 further includes a first slider member 104, a second slider member 106 and a third slider member 108 operatively connected to one another in the manner hereinafter described. The supporting rack 102 is fixedly connected to the first slider member 104 and moveable therewith. The first slider member 104 is connected to the third slider member 108 via at least one, and preferably two, extension springs 110. The second slider member 106 is positioned generally intermediate the first slider member 104 and the third slider member 108, as described hereinafter.

Figure 5:
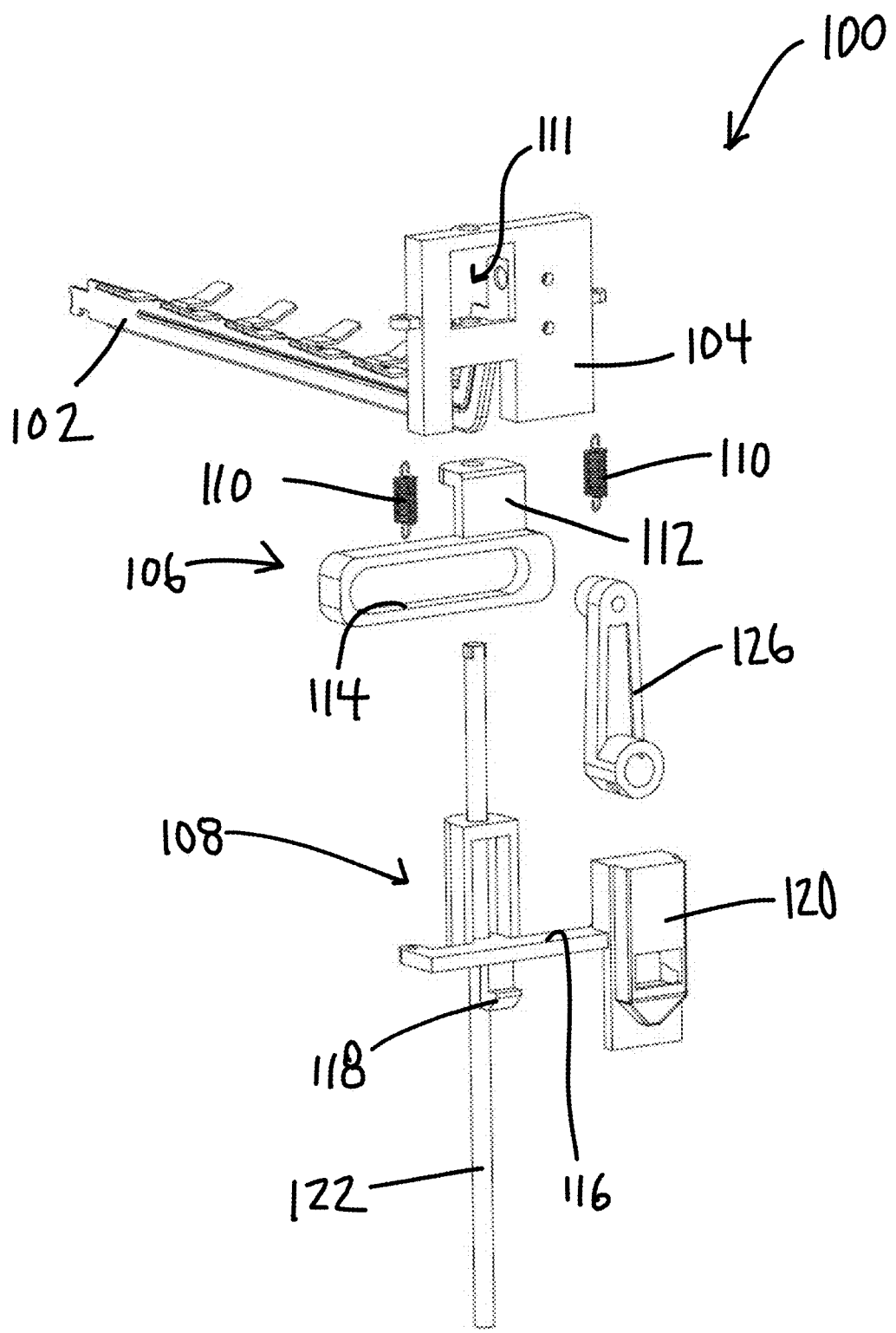
FIG. 5 is an exploded, perspective view of the carriage assembly of FIG. 2.

As best shown in FIG. 5, the first slider member 104 includes a window 111 within which a linkage arm 112 of the second slider member 106 is received, and within which the linkage arm 112 is vertically moveable, as discussed below. The second slider member 106 also includes a horizontally-oriented slot 114 located below the linkage arm 112, the purpose of which will be described below. The third slider member 108, for its part, includes an upwardly-facing contacting surface 116 for contacting engagement with the second slider member 106, a first engagement member in the form of a hook lock 118 located beneath the contacting surface 116 and a switch actuator in the form of a finger 120 connected to a distal end of the contacting surface 116 and laterally offset from the hook lock 118.

The first slider member 104, second slider member 106 and third slider member 108 are each slidably connected to a vertically-oriented guide rod 122 which may be considered to form part of the carriage assembly 100 such that each of the first slider member 104, second slider member 106 and third slider member 108 are vertically moveable along the guide rod 122.

Figure 2:
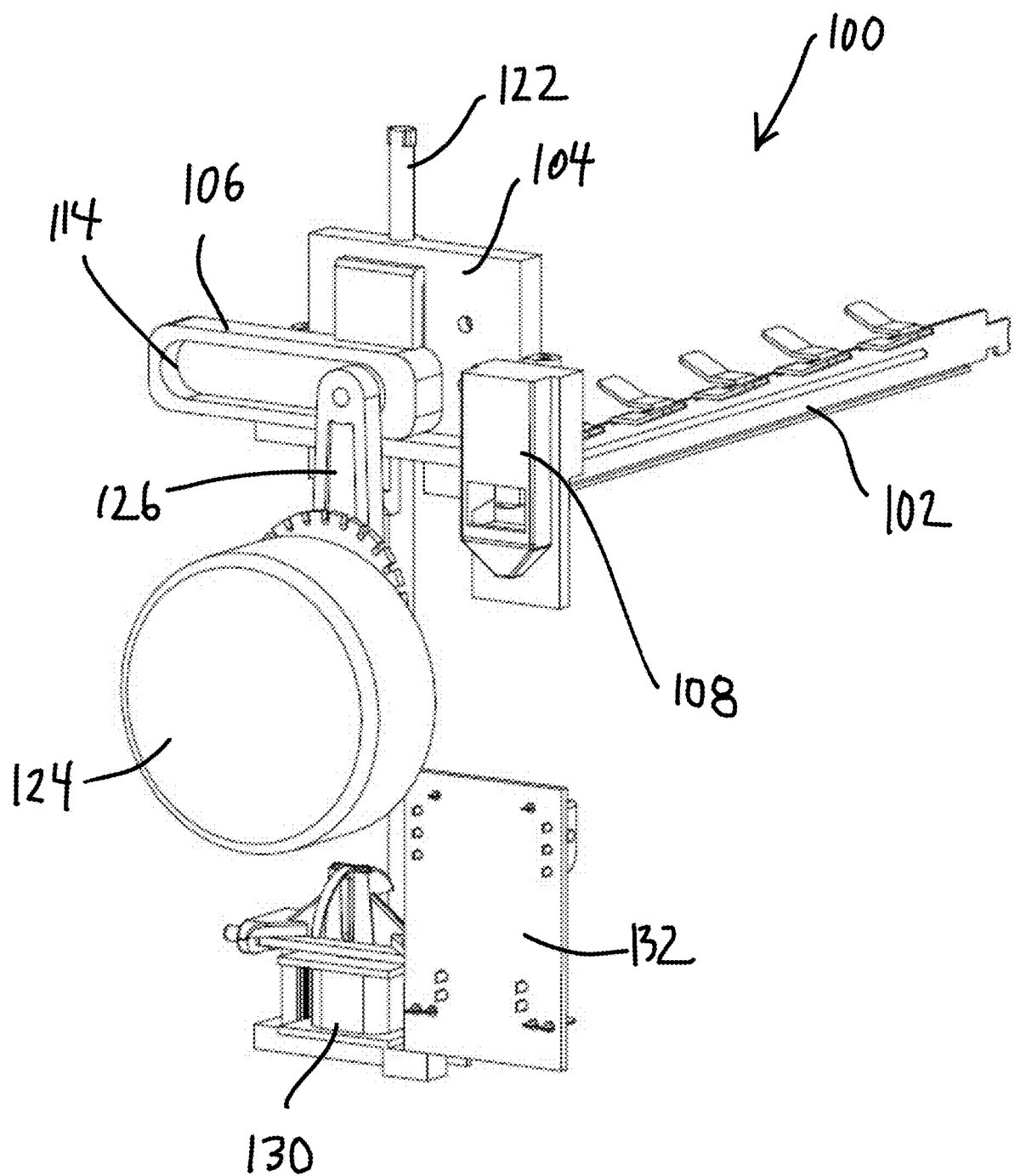
FIG. 2 is front, perspective view of a carriage assembly of the toaster of FIG. 1.
Figure 3:
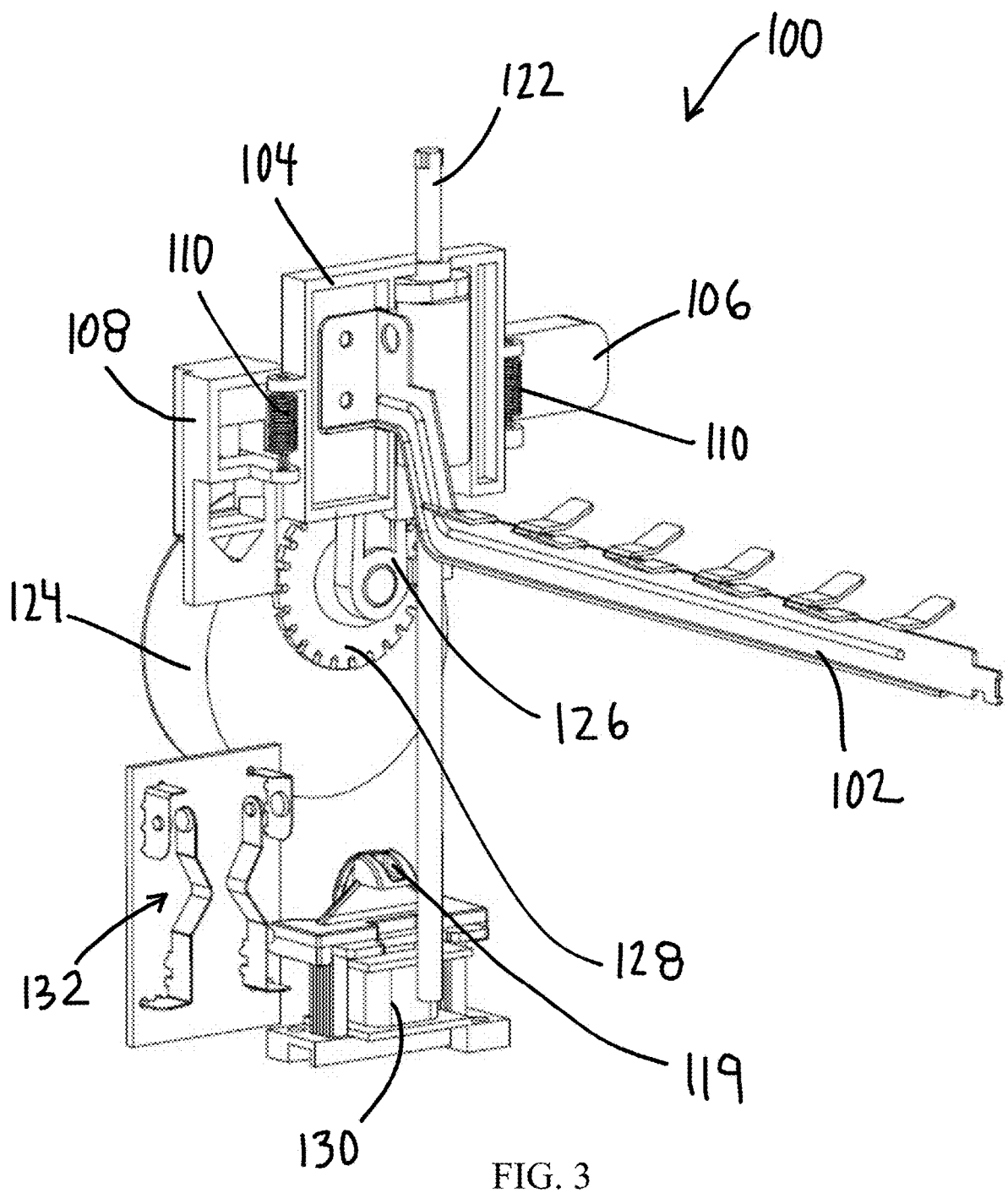
FIG. 3 is a rear, perspective view of the carriage assembly of FIG. 2.
Figure 4:
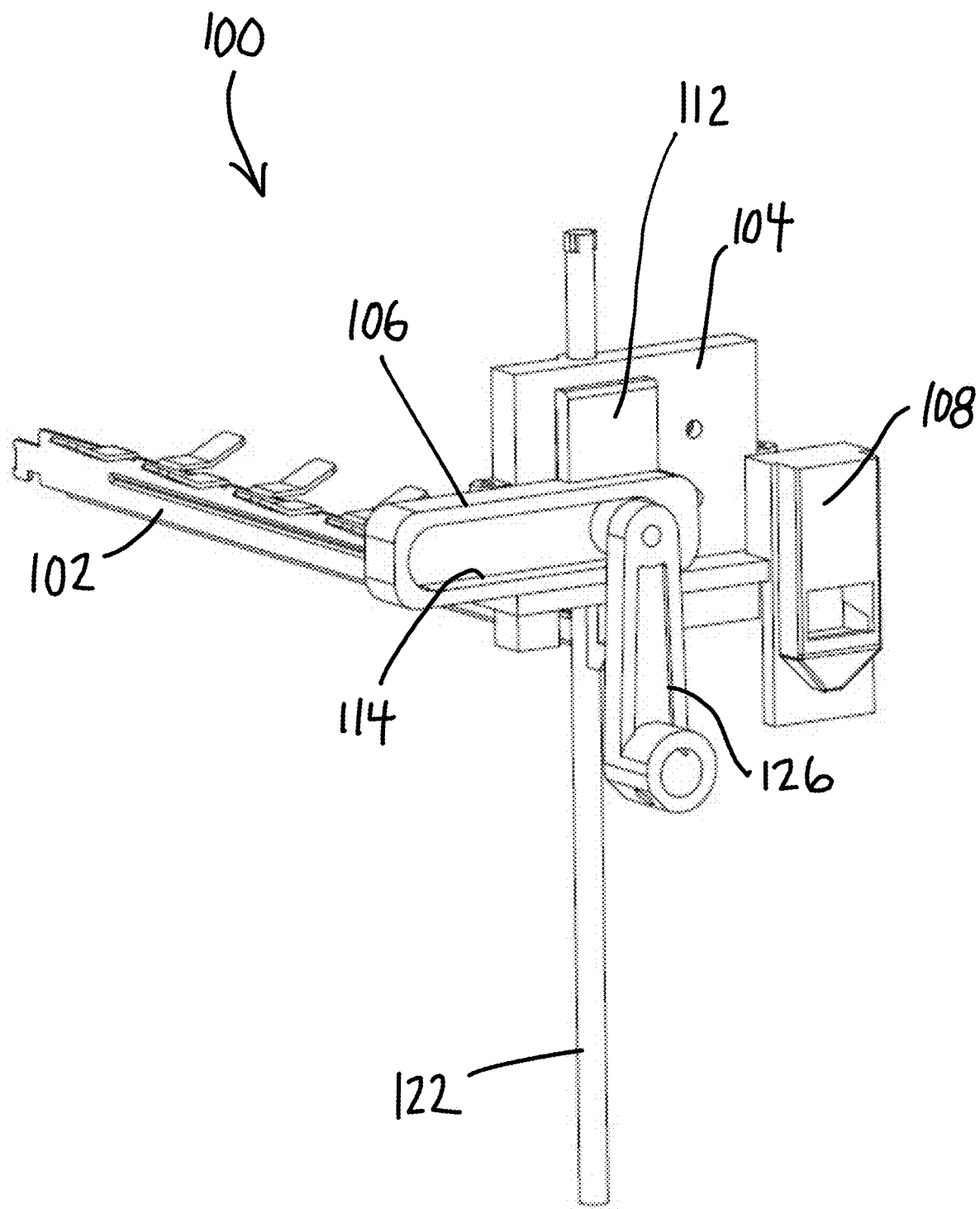
FIG. 4 is a front, perspective view of a portion of the carriage assembly of FIG. 2.

As shown in FIG. 2, the toaster 10 includes a driving motor 124 mounted within the housing 12 for producing a rotational force of predetermined magnitude. In an embodiment, the motor 124 may be a servo motor or a synchronous motor whose rotational force can be controlled by electrical power inputted through a motor control circuit implemented in the housing 12. As shown in FIGS. 2 and 3, the toaster 10 further includes a crank or driving member 126 having a first end connected to the motor 124 and a second end received in the slot 114 of the second slider member 106. As disclosed hereinafter, when the driving motor 124 is actuated to rotate the driving member 126, the driving member 126 drives the supporting rack 102 (via the first, second and third sliding members 104, 106, 108) to slidably move along the toaster slot 14 between an upper position and a lower toasting position.

In connection with the above, and as described more fully below, the toaster 10 and/or carriage assembly 100 further includes a position sensor disc 128 operatively connected to the motor 124 for sensing or detecting a position of the crank 126, an electromagnet 130 and a power switch 132 which, in the embodiment of FIGS. 2-5, may be a leaf spring power switch.

Figure 6:
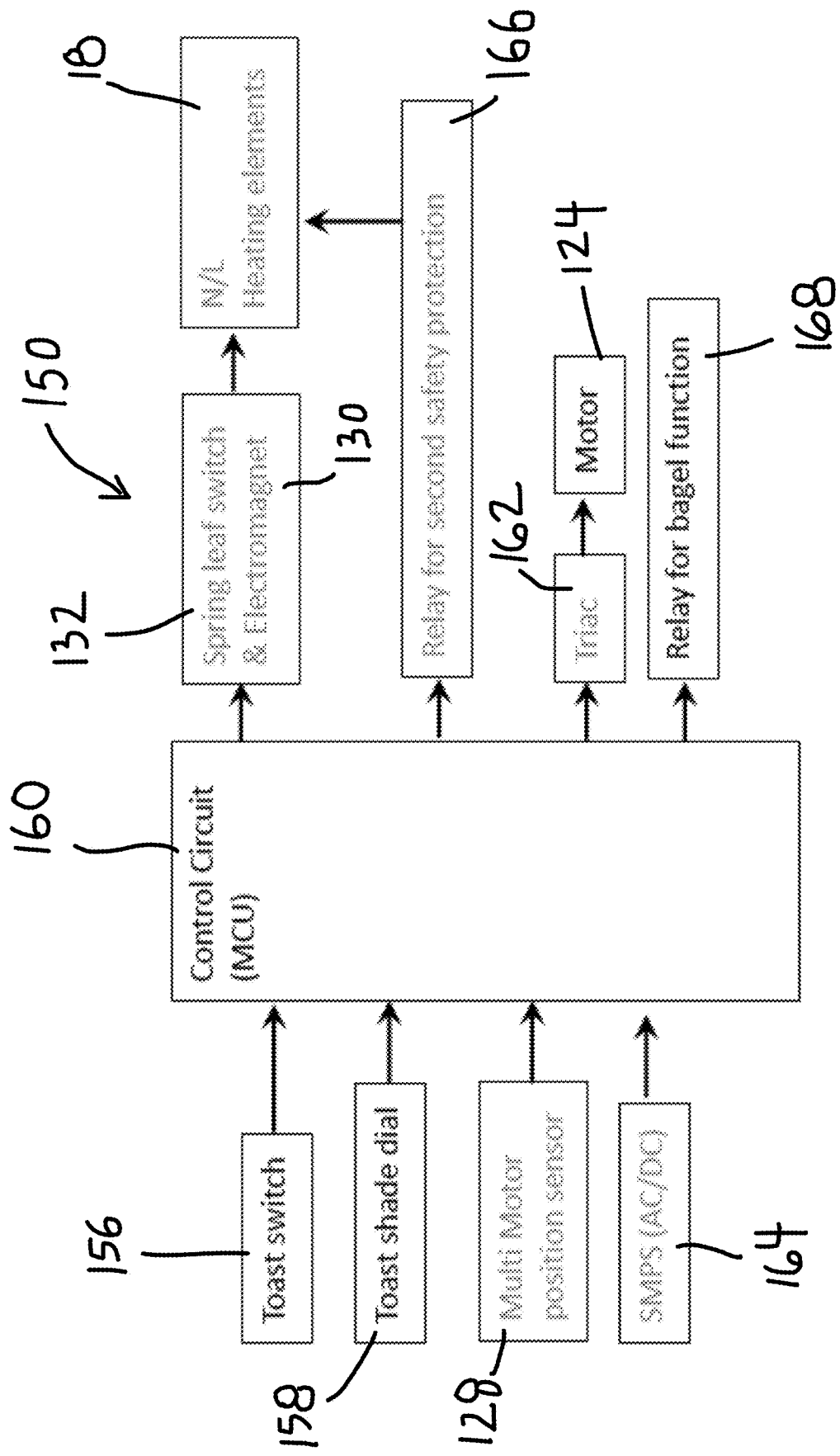
FIG. 6 is a schematic illustration of the system and control logic of the toaster of FIG. 1.

With reference to FIG. 6, a schematic illustration of a control system 150 for the toaster 10 is illustrated. As illustrated therein, the toaster 10 may include a user interface having a plurality of buttons, switches and/or dials for selecting toast modes, shades, etc. For example, the interface may include a toast switch/button 156 and a toast shade dial 158 in communication with the control unit 160. As also shown therein, the position sensor disc 128 is also electrically connected or otherwise in communication with the control unit 160 for sending signals indicative a position of the motor 124 and/or crank 126 to the control unit 160. In particular, the control system 150 utilizes the position sensor disc 128 and a triac 162 to control the driving motor 124, as described hereinafter. The control system 150 may also include a switch mode power supply circuit 164 instead of a transformer.

With further reference to FIG. 6, and as indicated above, the control system 150 includes the leaf spring switch 132 and electromagnet 130 which are utilized to control the heating elements 18. This is in contrast to conventional toasters which typically utilize two relay to control the heating elements. The control system 150, however, may also include a relay 166 controllable via the control unit 160 for safety protection to cut off power to all heating elements 18 in the case of failure. In addition, the control system 150 may include a relay 168 for a bagel toasting function, as disclosed hereinafter.

Figure 7:
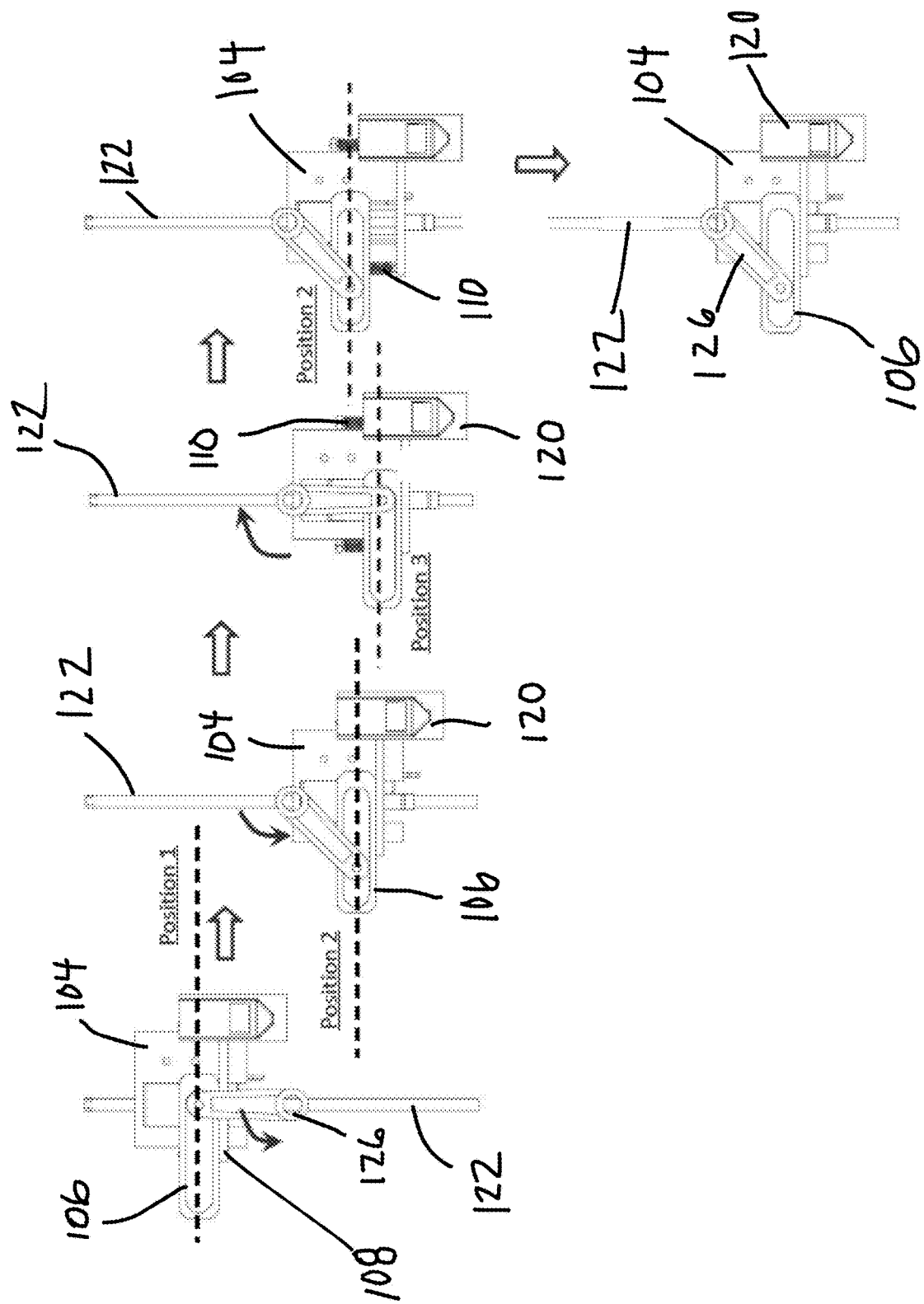
FIG. 7 are front elevational views of the carriage assembly illustrating operation thereof.
Figure 8:
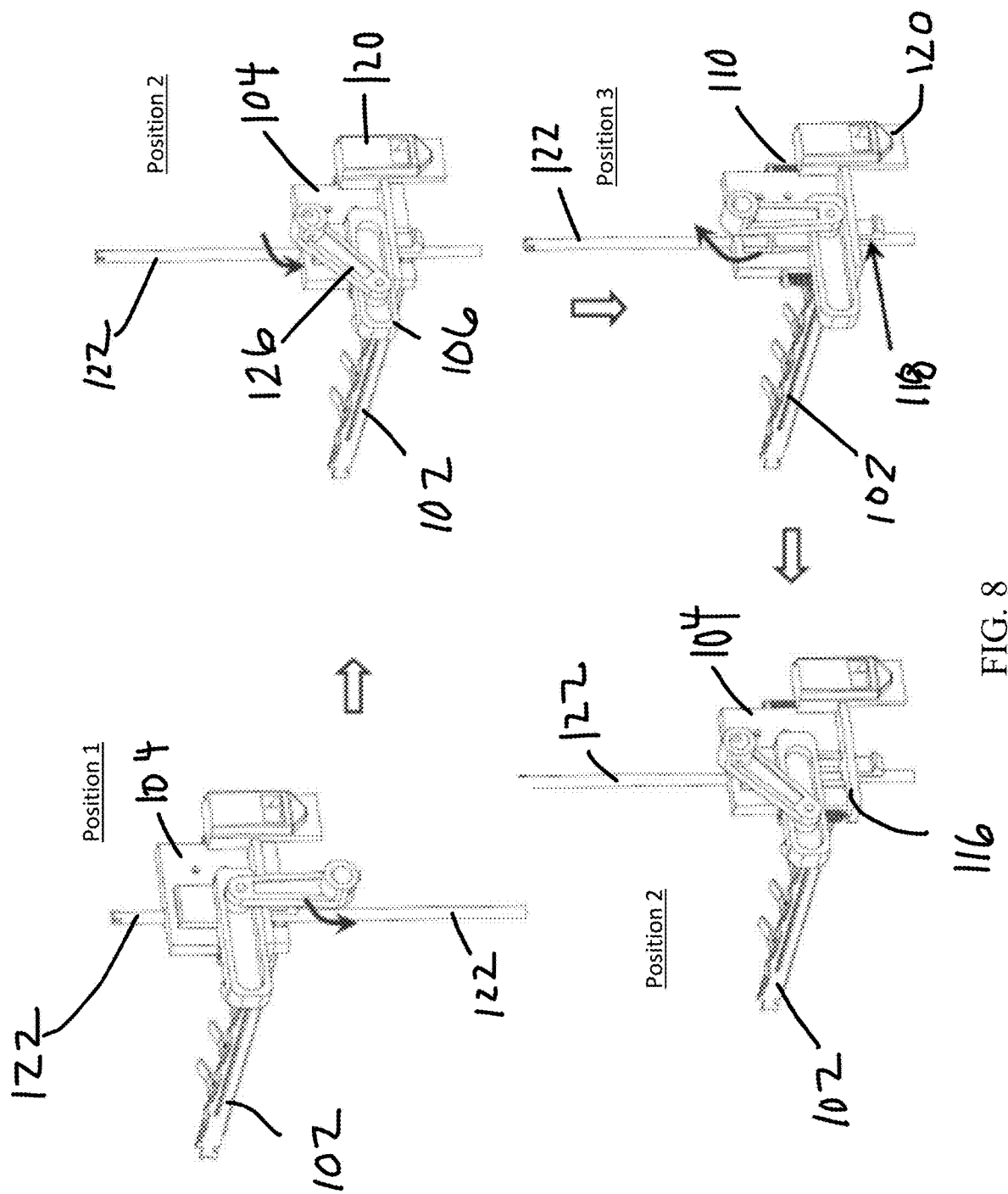
FIG. 8 are perspective views of the carriage assembly illustrating operation thereof.
Figure 9:
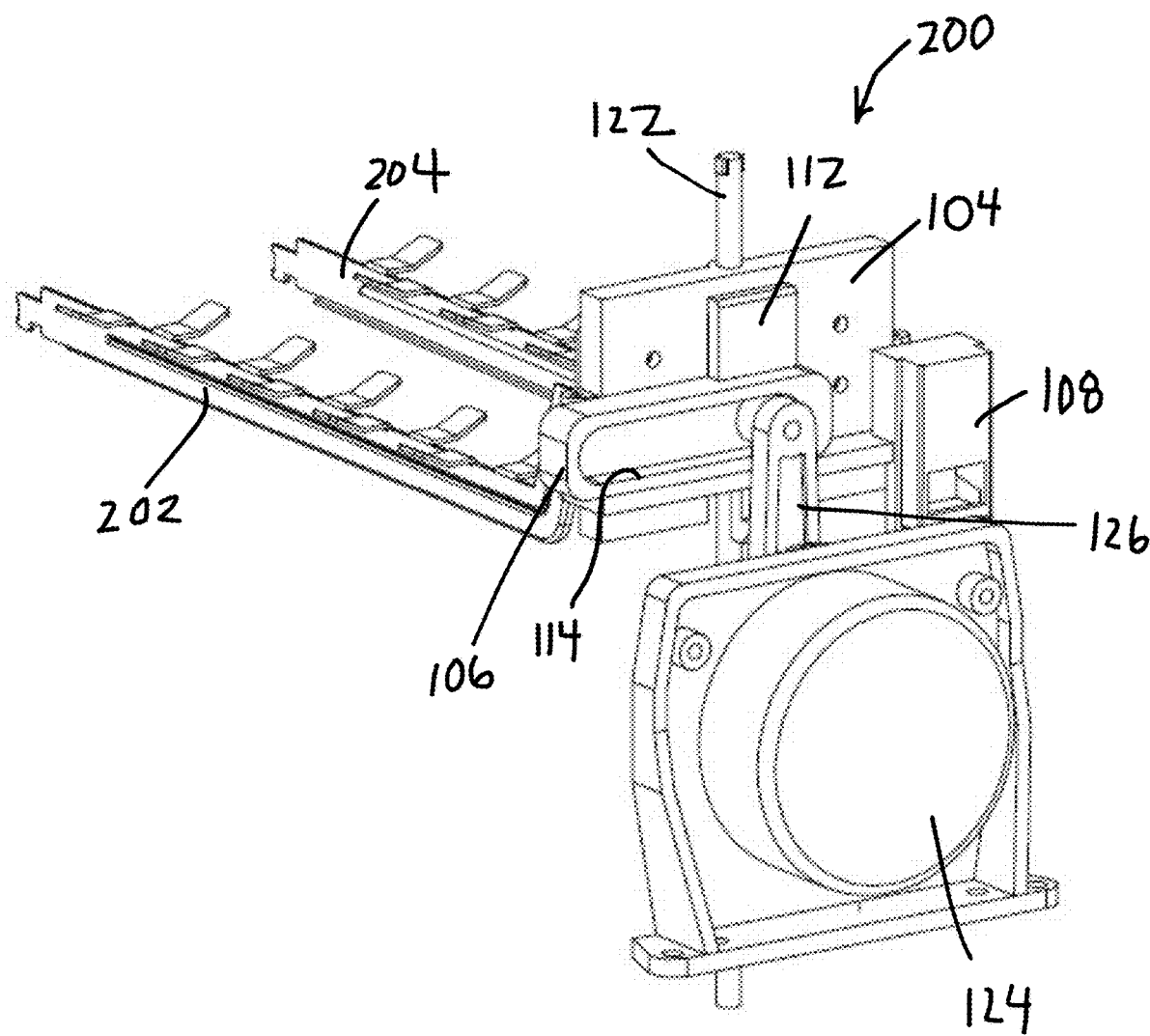
FIG. 9 is front, perspective view of a carriage assembly for a toaster according to another embodiment of the present invention.
Figure 10:
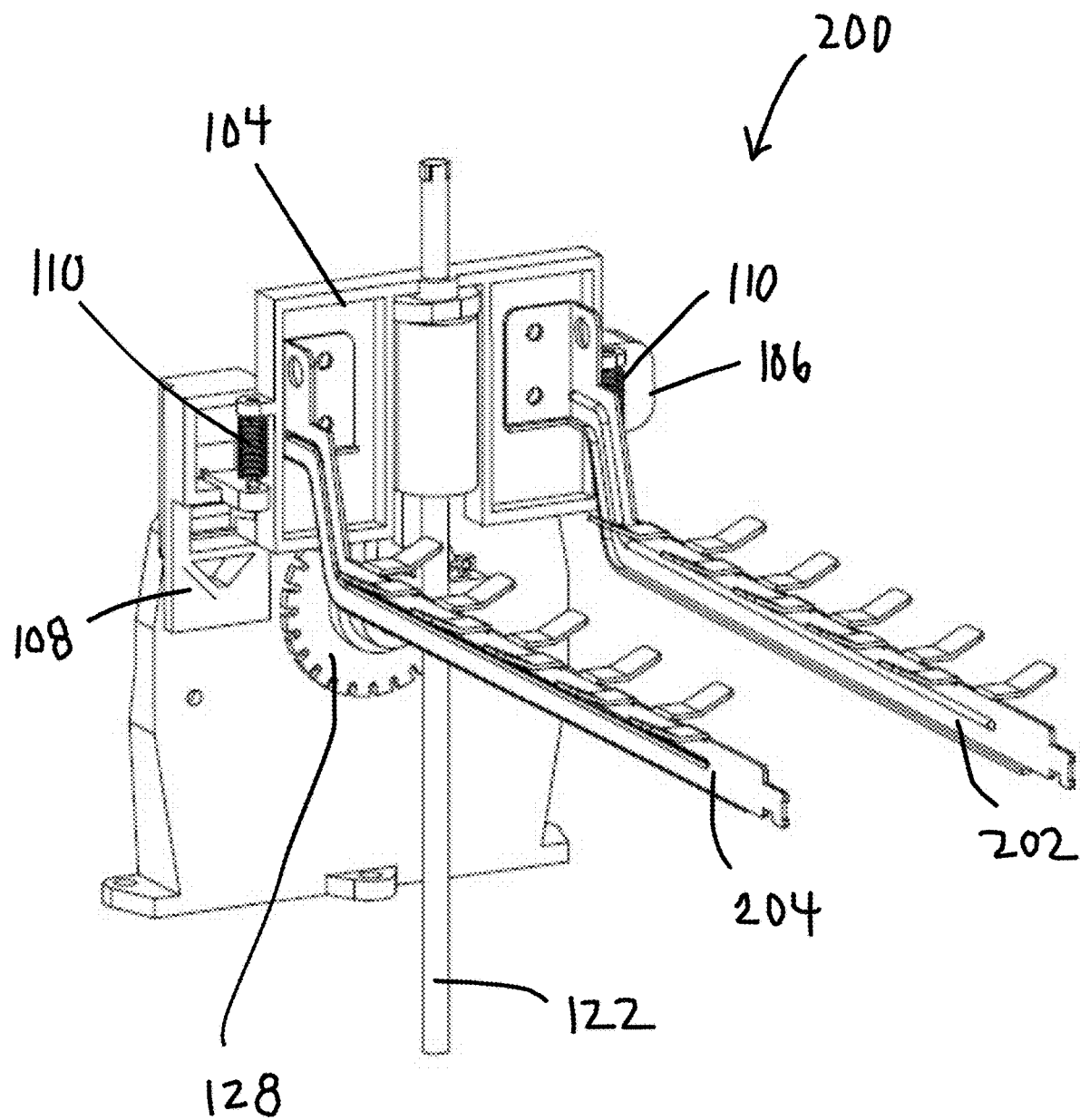
FIG. 10 is a rear, perspective view of the carriage assembly of FIG. 10.
Figure 11:
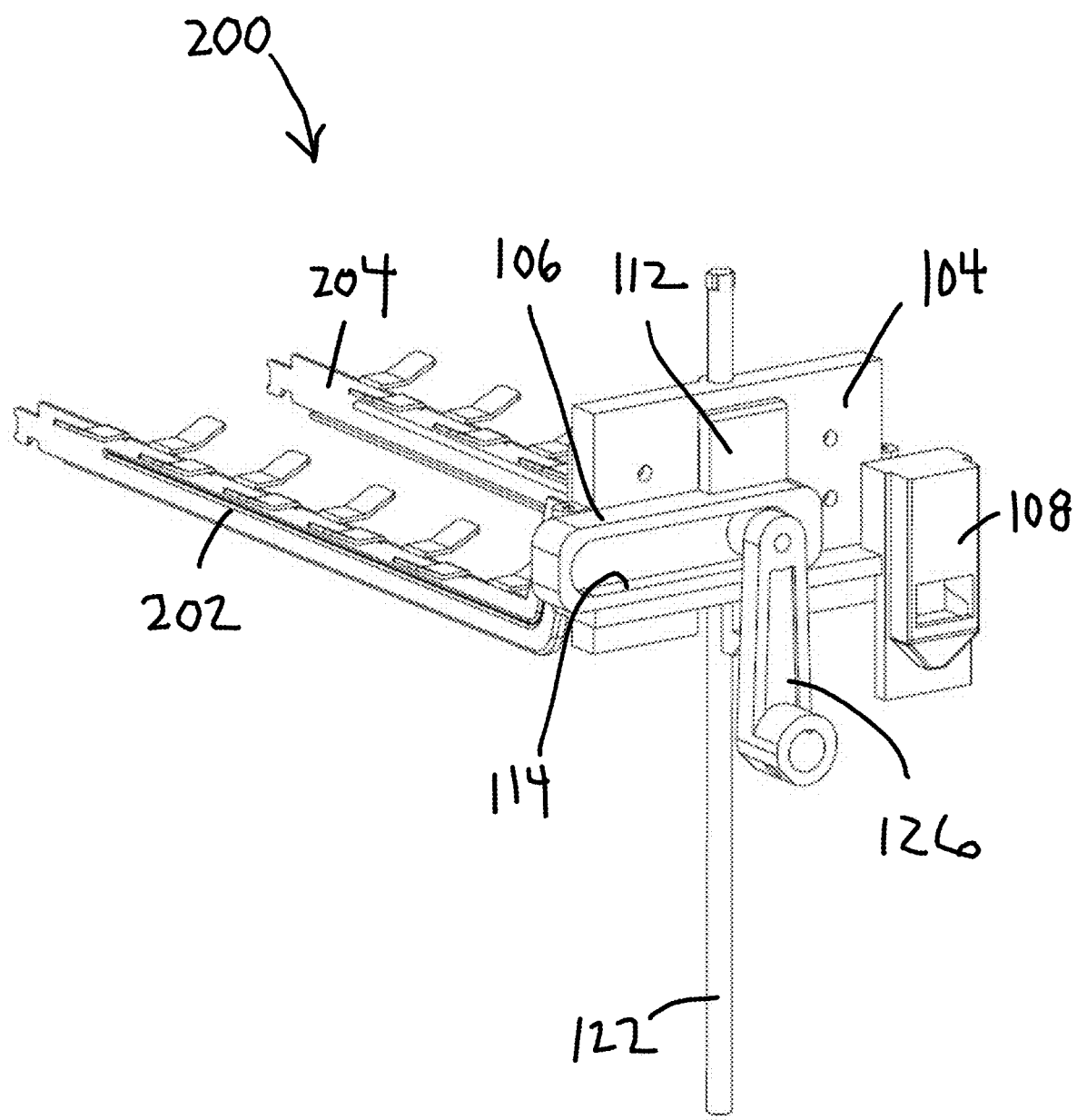
FIG. 11 is a front, perspective view of a portion of the carriage assembly of FIG. 10.
Figure 12:
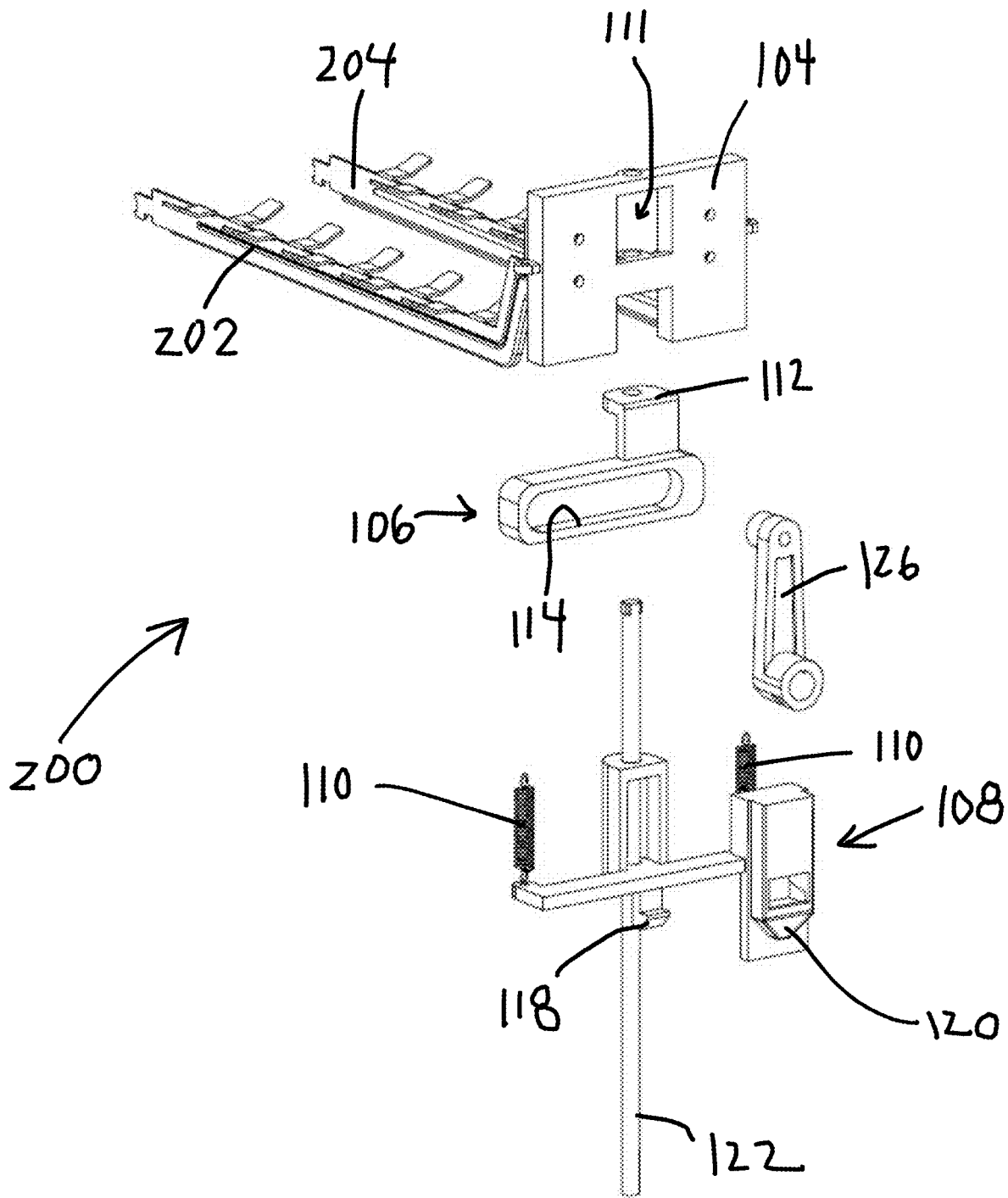
FIG. 12 is an exploded, perspective view of the carriage assembly of FIG. 10.
Figure 13:
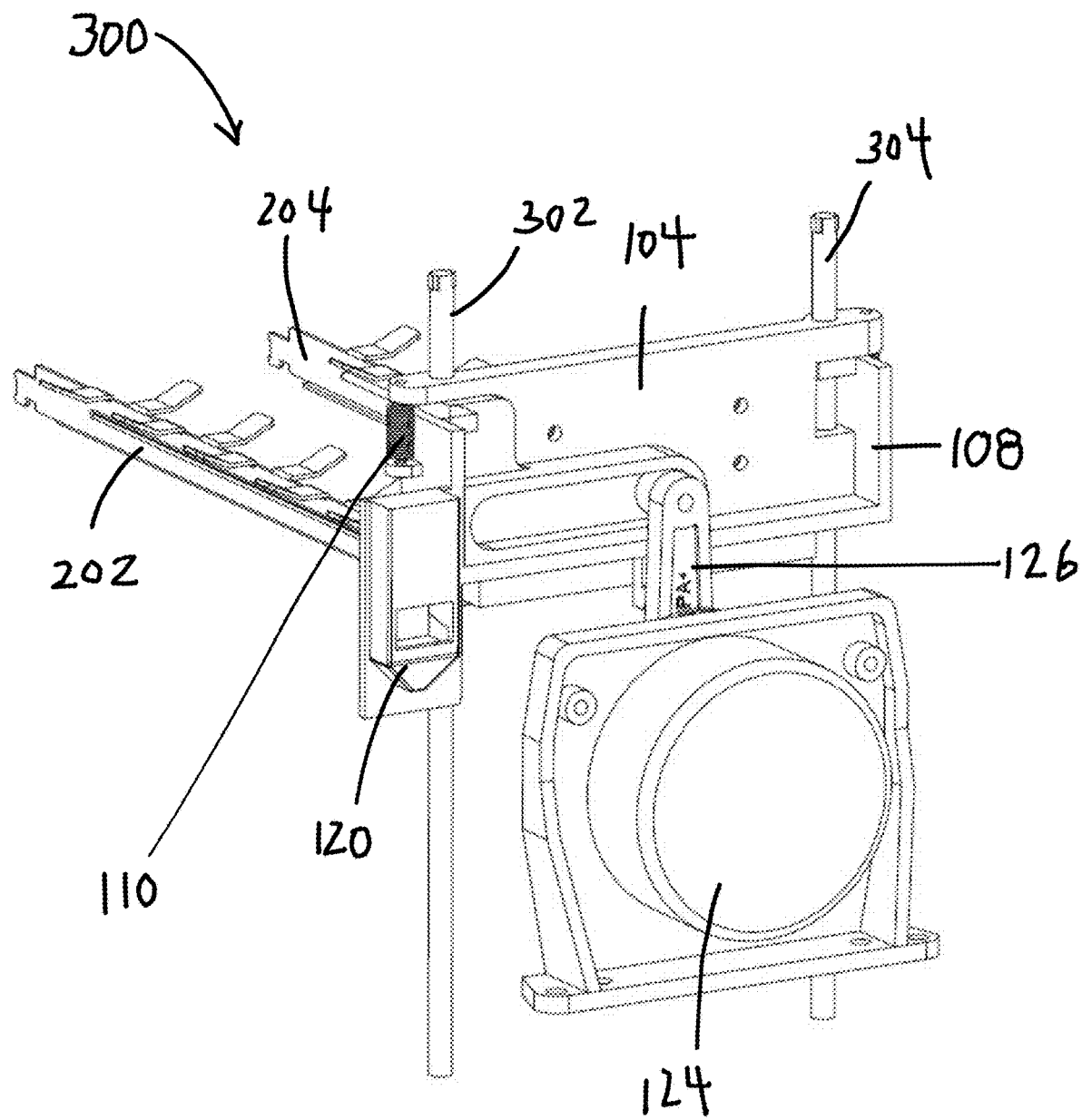
FIG. 13 is front, perspective view of a carriage assembly for a toaster according to another embodiment of the present invention.
Figure 14:
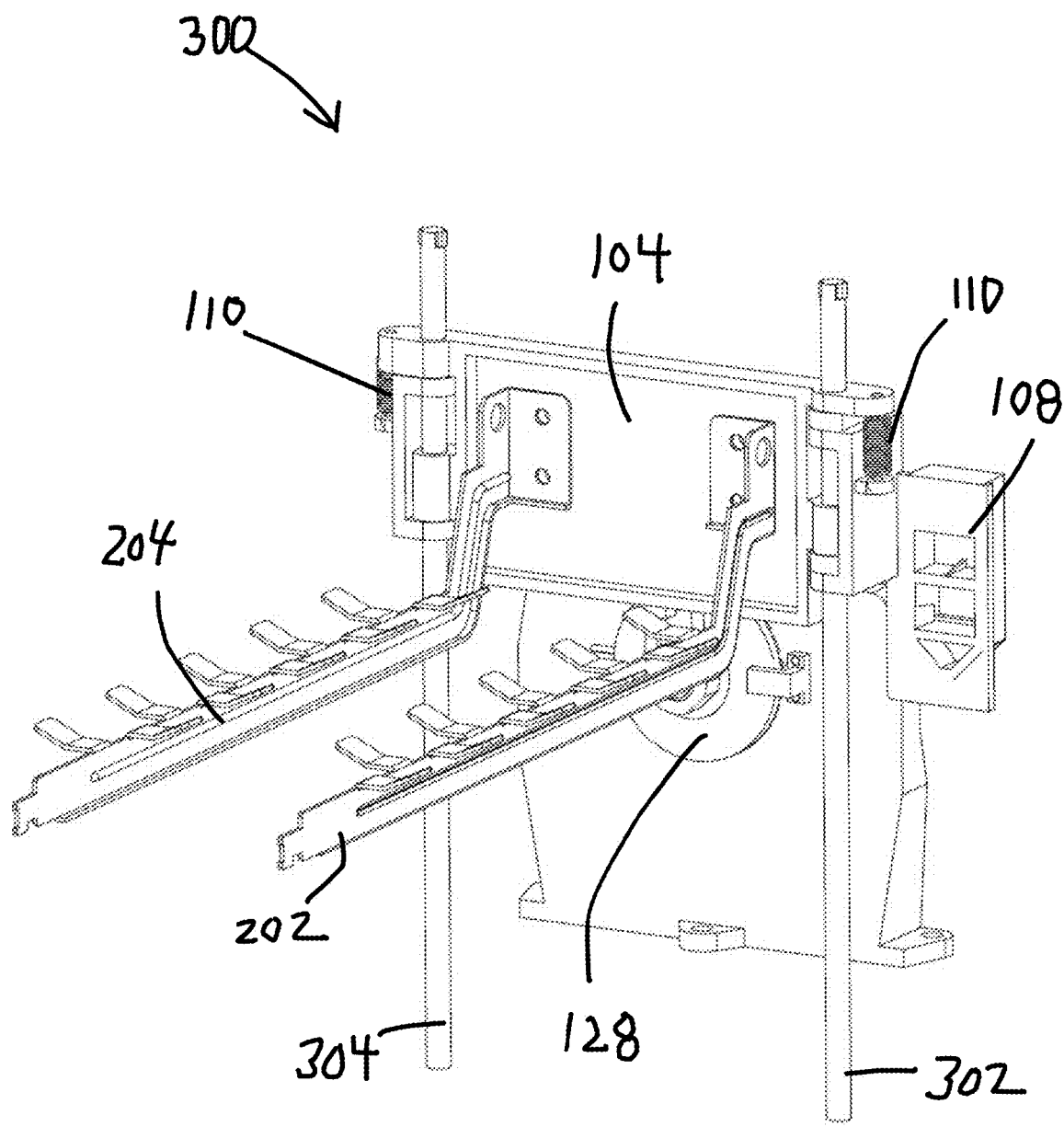
FIG. 14 is a rear, perspective view of the carriage assembly of FIG. 13.
Figure 15:
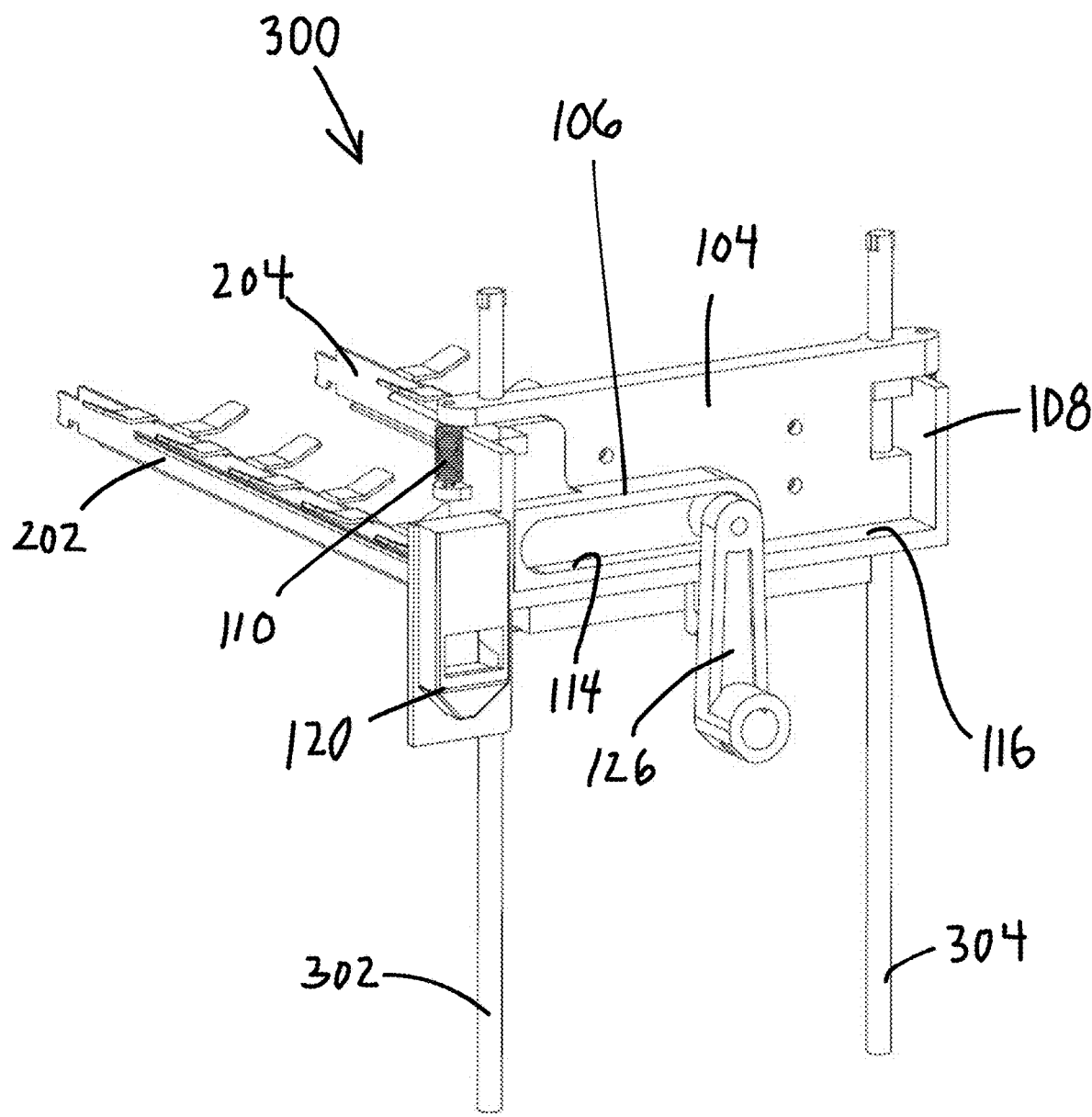
FIG. 15 is a front, perspective view of a portion of the carriage assembly of FIG. 13.
Figure 16:
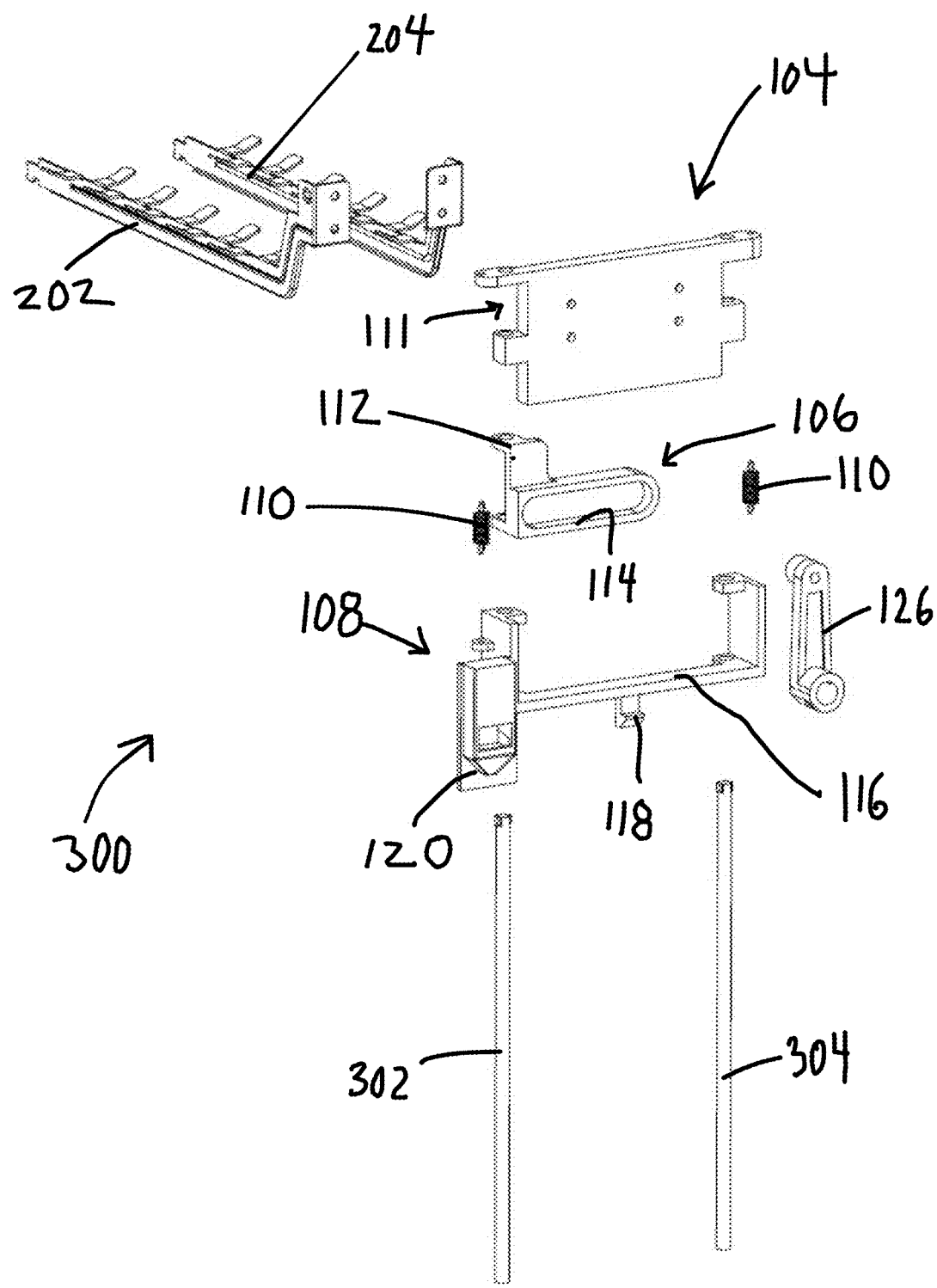
FIG. 16 is an exploded, perspective view of the carriage assembly of FIG. 13.

Turning now to FIGS. 7 and 8, operation of the carriage assembly 100 during a toasting operation is illustrated. Position 1 in FIG. 7 shows the position of the slider members 104, 106 108 before commencing a toasting operation. A shown therein, upon actuating the toast button/switch 156, the rotational output of the motor 124 drives the second slider member 106 downward along the guide rod 122 via engagement of the distal end of the crank 126 in the slot 114 of the second slider member 106. As the second slider member 106 moves downwardly, it contacts the upwardly-facing contacting surface 116 of the third slider member 108, thereby urging the third slider member 108 downward as well. Due to the connection of the third slider member 108 with the first slider member 104 via the extension springs 110, this downward movement of the third slider member 108 thus causes a corresponding downward movement of the first slider member 104 and connected supporting rack 102 along guide rod 122.

As shown in FIG. 7, the first slider member 104 and the supporting rack 102 stop the bottom of the chassis in a position in which the slice of bread carried by the supporting rack 102 is received fully in the slot 14 for toasting. This position is shown as Position 2 in FIG. 7. The second and third slider members 106, 108 keep moving downwardly as the motor 124 continues to drive the crank 126, against the bias of the extension springs 110 (which are loaded as the third slider member 108 keeps moving downwardly under urging from the second slider member 106 as the first slider member 104 remains stationary). As the third slider member 108 moves downwardly along the guide rod 122, the finger 120 of the third slider member 108 contacts the leaf spring switch 132 at the bottom-most position of the second slider member 106 and third slider member 108. In response to actuation of the leaf spring switch 132 by the finger 120, the control unit 160 energizes the electromagnet 130 to engage the hook lock 118 of the third slider member 108 via a second engagement member 119 to retain the third slider member 108 in position, as illustrated by Position 3 in FIG. 7.

The motor 124 continues to drive the second slider member 106 via engagement of the end of the crank 126 in the slot 114 of the second slider member 106. In particular, the motor 124 drives the second slider member 106 to move upwardly along the guide rod 122 (back to Position 2) while the third slider member 108 is retained in its bottom position via engagement of the hook lock 118 by the electromagnet 130 to continue the toasting operation. At this point (i.e., once the leaf spring switch 132 and electromagnet 130 are actuated, and the second slider member 106 is returned to Position 2), the control unit 160 activates the heating elements 18 to toast the food item within the slot 14.

At the end of the toasting operation, the electromagnet 130 is disengaged under control of the control unit 160 and the motor 124 drives supporting rack 102 upwardly along the guide rod 110. In particular, as the motor 130 urges the second slider member 106 upwardly via engagement of the distal end of the crank 126 in the slot 114 of the second slider member 106, the linkage arm 112 of the second slider member 106 moves upwardly within the window 111 of the first slider member 104 until it contacts the first slider member 104, urging it (and the connected supporting rack 102) upward to Position 1. The third slider member 108 follows via the interconnection between the first slider member 104 and the third slider member 108 via extension springs 110. Importantly, as the third slider member is moved upwardly, the finger 120 disengages from the leaf spring power switch 132, which causes the control unit 160 to deactivate the heating elements 18, ending the toasting operation.

In the event that the first slider member 104 or third slider member 108 are jammed, the electromagnet 130, being turned off, would release the hook lock 118 of the third slider member 108 as indicated above. Once the electromagnet 130 disengages the third slider member 108, the extension springs pull up on the third slider member 108 even in the event of a jam. This upward force generated by the extension springs 110 causes the finger 120 to disengage from the leaf spring power switch 132, causing the control unit 160 to deactivate the heating elements 18. In an embodiment, it is contemplated that the heating elements 18 may be directly controlled via activation/deactivation of the leaf spring power switch 132 rather than being controlled via the control unit 160. As indicated above, the auxiliary relay 166 can cut off power to all heating element 18 in the event of mechanism failure.

Turning now to FIGS. 9-12, a carriage assembly 200 according to an alternative embodiment of the present invention is illustrated. The carriage assembly 200 is generally similar in configuration and operation to carriage assembly 100, where like reference numerals designate like parts. As shown therein, however, the carriage assembly 200 includes a pair of supporting racks 202, 204 for support two separate slices of bread or other food items. In particular, each supporting rack 202, 204 may be positioned in a respective slot 14 in the housing and fixedly connected to a single first sliding member 104. In an embodiment, the first sliding member 104 may be made wider so as to allow for the connection of both supporting racks 202, 204. Operation of the carriage assembly 200 as the same described above in connection with carriage assembly 100, however, rather than toasting a single slice of bread, carriage assembly 200 allows for the toasting of two slices of bread simultaneously.

With reference to FIGS. 13-16, a carriage assembly 300 according to an alternative embodiment of the present invention is illustrated. The carriage assembly 300 is generally similar in configuration and operation to carriage assembly 100 and 200, where like reference numerals designate like parts. As shown therein, the carriage assembly 300 includes a pair of supporting racks 202, 204 for simultaneously toasting or browning two separate food items in respective slots 14 of the toaster 10 in the manner described above (i.e., using a single carriage assembly and motor 124). Rather than the carriage assembly having a single guide rod along which the first, second and third slider assemblies 104, 106, 108 are slidably mounted, the carriage assembly 300 includes at least two guide rods 302, 304 on which the first, second and third slider assemblies 104, 106, 108 are slidably mounted. As illustrated therein, it is contemplated that various modifications may be made to the first slider assembly 104, second slider assembly 106 and third slider assembly 108 to facilitate mounting of these components to the guide rods 302, 304 and to facilitate operative interconnection between these components to achieve smooth operation of components in the manner described above.

Figure 17:
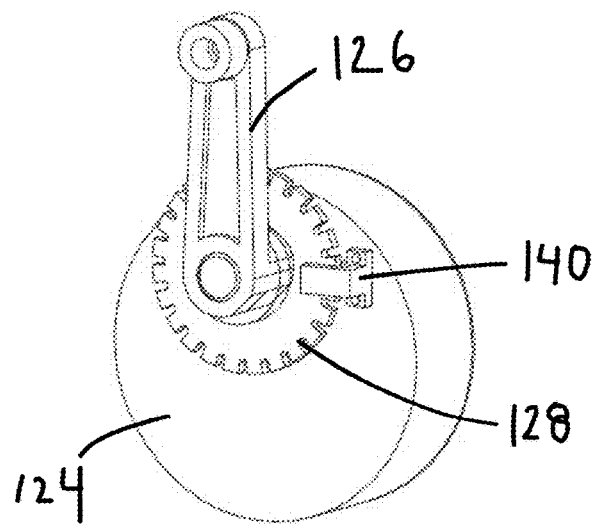
FIG. 17 is a perspective view of a carriage positioning system of the toaster of FIG. 1.
Figure 18:
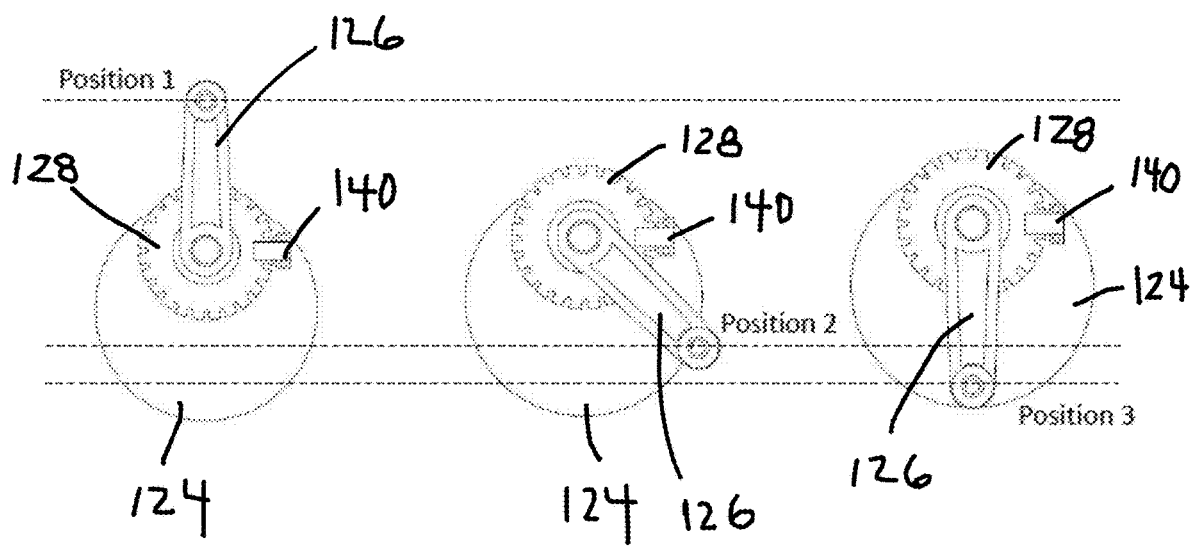
FIG. 18 is a schematic illustration showing operation of the carriage positioning system of FIG. 17.

Turning now to FIGS. 17 and 18, more detailed views of the motor 124 and positioning system of the toaster 10 are illustrated. As best shown in FIG. 17, the positioning system of the toaster 10 includes the motor 124, crank 126, a position sensor disc 128 having a plurality of notches or teeth on an outer periphery thereof, and a sensor 140 which may be, in an embodiment, an infrared sensor. The infrared sensor 140 is configured to sense/monitor the position of the position sensor disc 128 and provide a position signal indicative of the position of the position sensor disc 128 and crank 126, which rotate together, to the control unit 160. The control unit 160 and triac 162 therefore control the motor 124 in response to this input from the sensor 140.

As best shown in FIG. 18, in the first position, the crank 126 extends substantially vertically upward, in which case the slider assemblies 104, 106, 108 and the supporting racks (e.g., supporting racks 202, 204) are controlled to their uppermost positions whereby food items can be placed in the slots 14 and supported such that the food items extend from the top openings 16. In a second position, the motor 124 has rotated the crank 126 to drive the supporting racks 202, 204 to their lowermost positions (where the first slider assembly 104 stops moving downwardly, and where the second and third slider assemblies 106, 108 continue moving downwardly). After reaching the second position, the motor 124 continues to rotate the crank 126 to the third position, where the crank 126 extends substantially vertically in the downward direction (opposite of the first position). When moving from the second position to the third position, the finger 120 of the third slider assembly 108 actuates the switch 132 to activate the heating elements 18 (i.e., to provide power to the heating elements 18) to commence toasting of the food items, as disclosed above.

It is contemplated that the crank 126 may be configured to stop at more than one position under control of the motor 124 and control unit 160. In an embodiment, the motor may be a synchronous motor, an AC motor, a DC motor or a brushless motor, although other types of motors and driving mechanisms may also be utilized without departing from the broader aspects of the invention.

Figure 19:
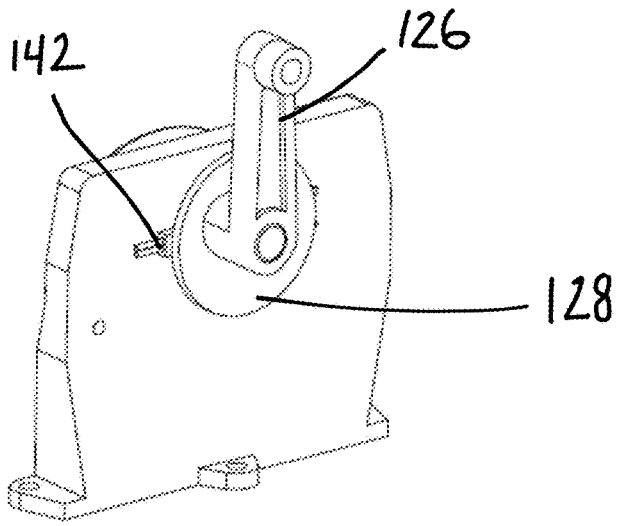
FIG. 19 is a perspective view of a carriage positioning system according to another embodiment of the invention.
Figure 20:
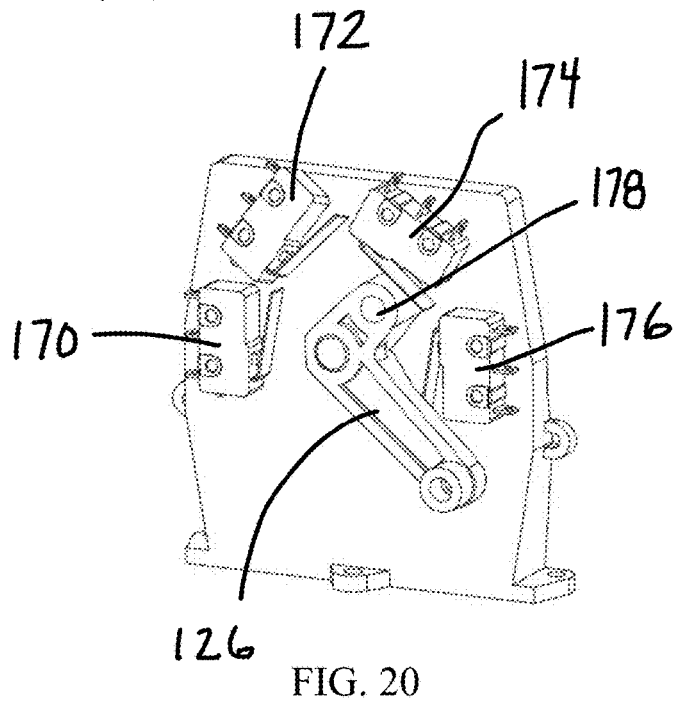
FIG. 20 is a perspective view of a carriage positioning system according to another embodiment of the invention.
Figure 21:
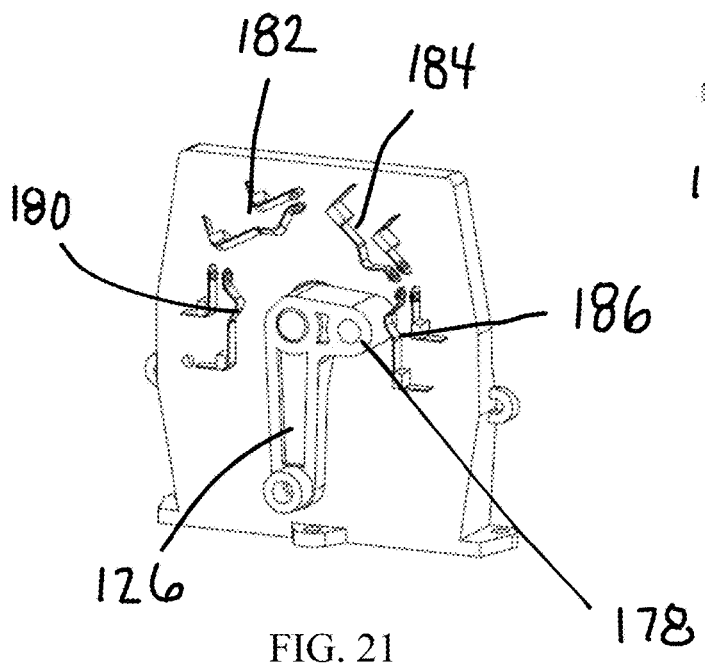
FIG. 21 is a perspective view of a carriage positioning system according to another embodiment of the invention.

Turning now to FIGS. 19-21, alternative configurations for the positioning system of the toaster 10 are illustrated. With particular reference to FIG. 19, in an embodiment, the position sensor for sensing the position of the positioning sensor disc 128 may be a hall sensor 142 which provides a position signal to the control unit 160. As shown in FIG. 20, in an embodiment, the positioning system may alternatively include a plurality of micro switch sensors (e.g., sensors 170, 172, 174, 176) and the crank 126 may have a projection 178 that is configured to actuate each micro switch as the crank 126 rotates under control of the motor 124. The control unit 160 is able to determine the position of the slider assemblies and supporting racks based upon which micro switch has been actuated. Namely, the micro switch sensors 170, 172, 174, 176 provide a position signal to the control unit 160 indicative of the orientation of the crank 160 (and thus the slider assemblies and supporting racks). While four micro switch sensors are illustrated, it is contemplated that more or fewer than four sensors may be utilized to provide more or less precise control over the positioning of the carriage assembly.

With reference to FIG. 21, in an embodiment, the positioning system may alternatively include a plurality of leaf spring switches (e.g., switches 180, 182, 184, 186) and the crank 126 may likewise have a projection 178 that is configured to actuate each leaf spring switch as the crank 126 rotates under control of the motor 124. The control unit 160 is able to determine the position of the slider assemblies and supporting racks based upon which leaf spring switch has been actuated. Namely, the leaf spring switches provide a position signal to the control unit 160 indicative of the orientation of the crank 160 (and thus the slider assemblies and supporting racks). While four leaf spring switches are illustrated, it is contemplated that more or fewer than four leaf switches may be utilized to provide a greater (or lower) level of control over the positioning of the carriage assembly.

Figure 22:
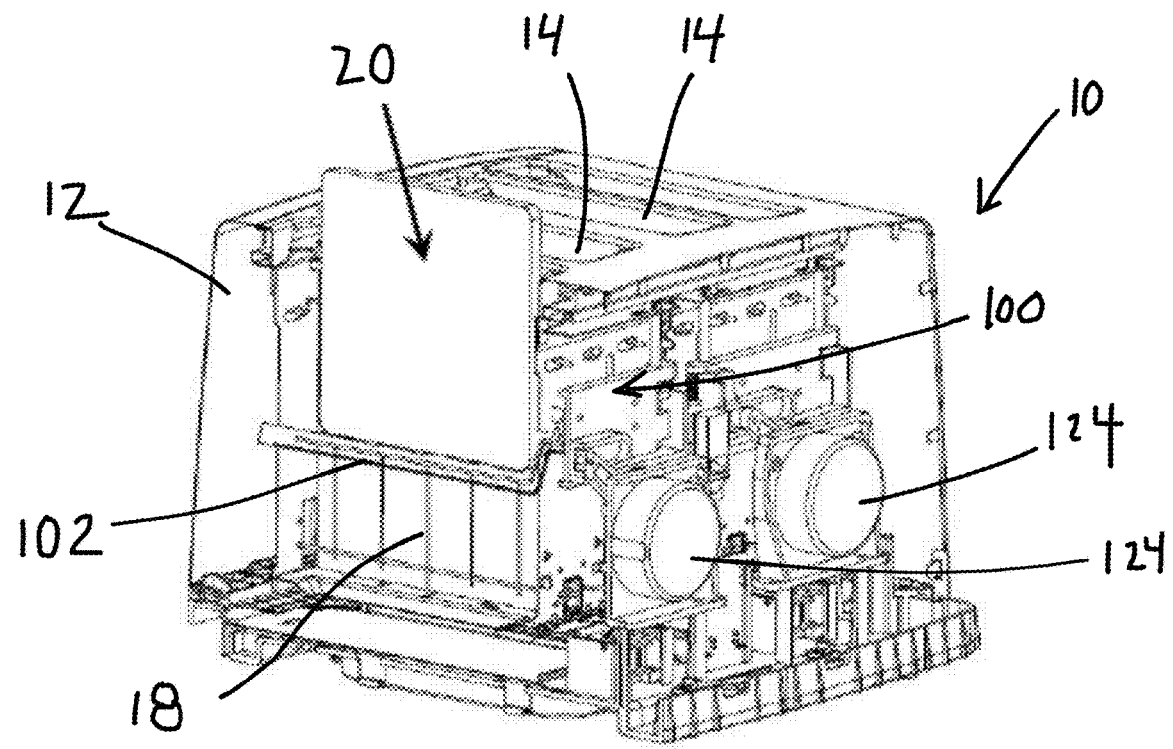
FIG. 22 is a perspective view of the toaster of FIG. 1, illustrating operation thereof with a standard size food item.
Figure 23:
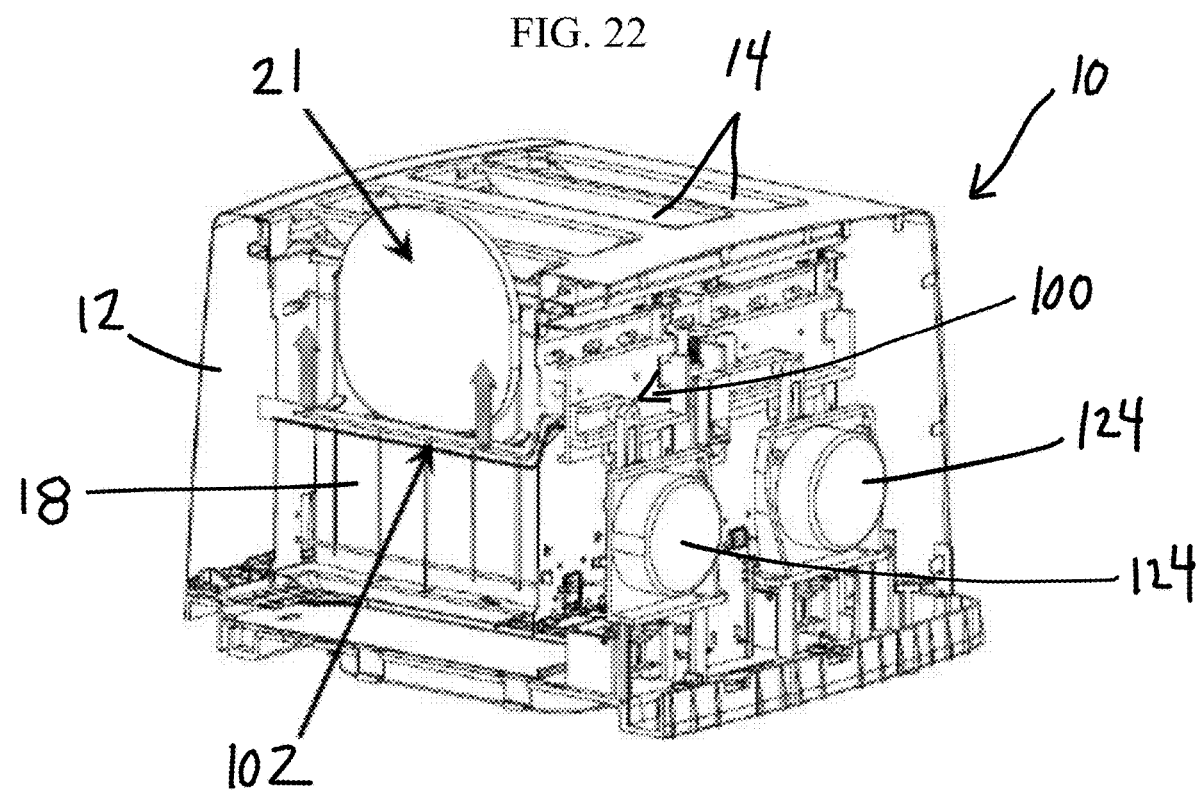
FIG. 23 is a perspective view of the toaster of FIG. 1, illustrating operation thereof with a shorter food item.

Turning now to FIGS. 22 and 23, in an embodiment, the toaster 10 and/or control unit 160 thereof may be programmed with a plurality of modes specifically tailored to the size of the food item to be toasted. In particular, as shown in FIG. 1, the control unit 160 may be preprogrammed with a user-selectable mode for toasting a standard size slice of bread 20. In such mode, the control unit 150 is configured to control the motor 124 to position the supporting rack 102 at a position whereby user can easily load a slice of bread 20 into the slot 14 and remove the slice of bread 20 from the slot 14 after the toasting operation is completed. In addition, the control unit 160 may be preprogrammed with a user-selectable mode for toasting a smaller size food item such as a waffle or frozen pancake 21. In such mode, the control unit 150 is configured to control the motor 124 to position the supporting rack 102 at a higher position within the slot 14 so that a user can easily load the smaller food item 21 into the slot 14 and remove the food item 21 from the slot 14 after the toasting operation is completed. In an embodiment, the modes may be selectable via a button, dial, switch or the like on the housing 12. In an embodiment, more than two rack height modes may be programmed into the toaster.

Figure 26:
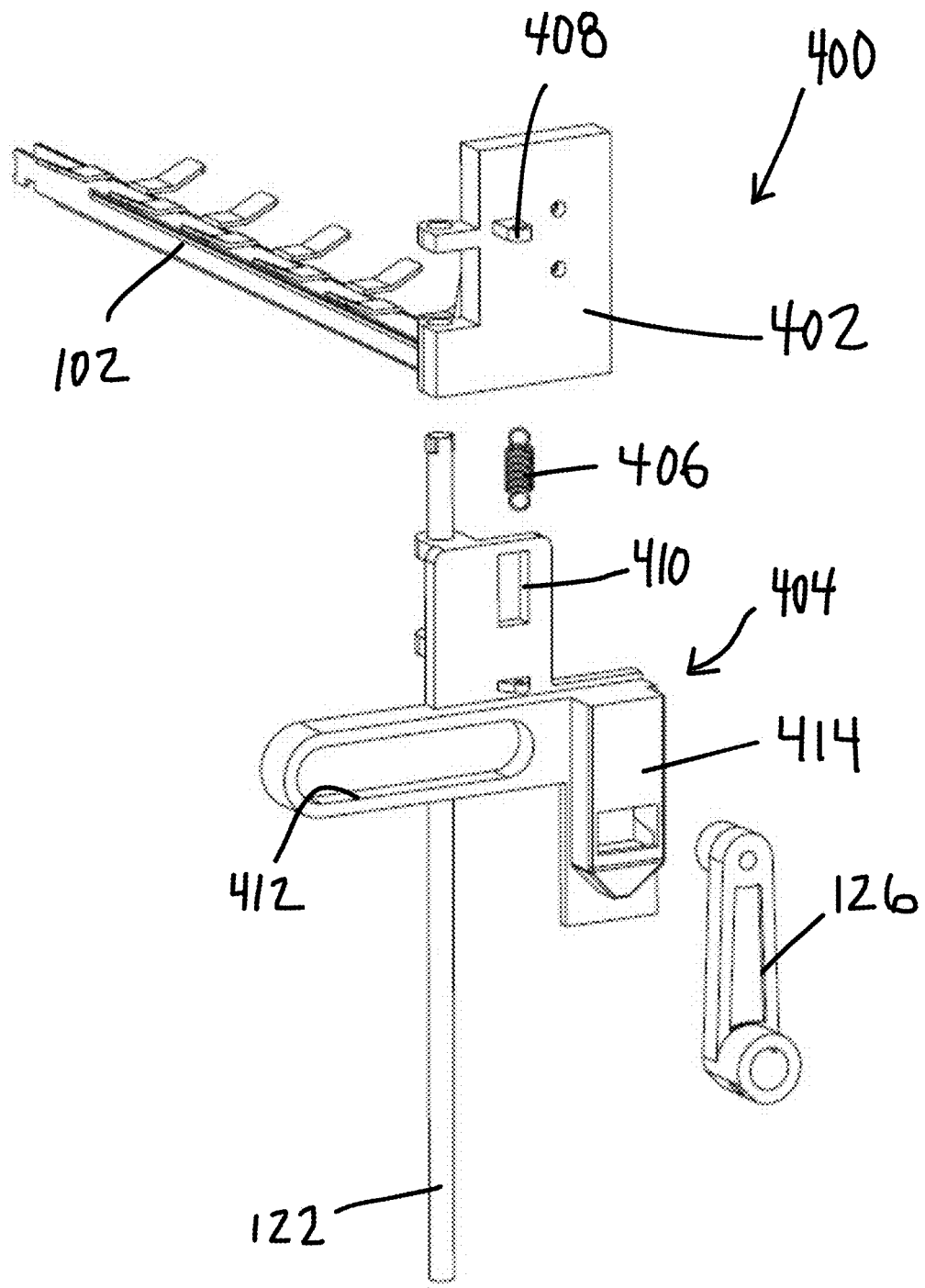
FIG. 26 is an exploded, perspective view of the carriage assembly of FIG. 24.

With reference to FIG. 26, a carriage assembly 400 for a toaster, such as toaster 10, according to yet another embodiment of the present invention is illustrated. The carriage assembly 400 is generally similar in configuration and operation to carriage assembly 100, where like reference numerals designate like parts. As illustrated, the carriage assembly 400 includes a bread supporting rack 102 mounted in the toaster slot 14 in a vertically movable manner. The supporting rack 102 is configured to support a food item such as a slice of bread, and to raise and lower the slice of bread within the slot 14 under control of the control unit, as discussed in detail above. As shown therein, the carriage assembly 400 further includes a first slider member 402 and a second slider member 404 operatively connected to one another in the manner hereinafter described. The supporting rack 102 is fixedly connected to the first slider member 402 and moveable therewith. The first slider member 402 is connected to second member 404 via at least one extension spring 406.

Figure 24:
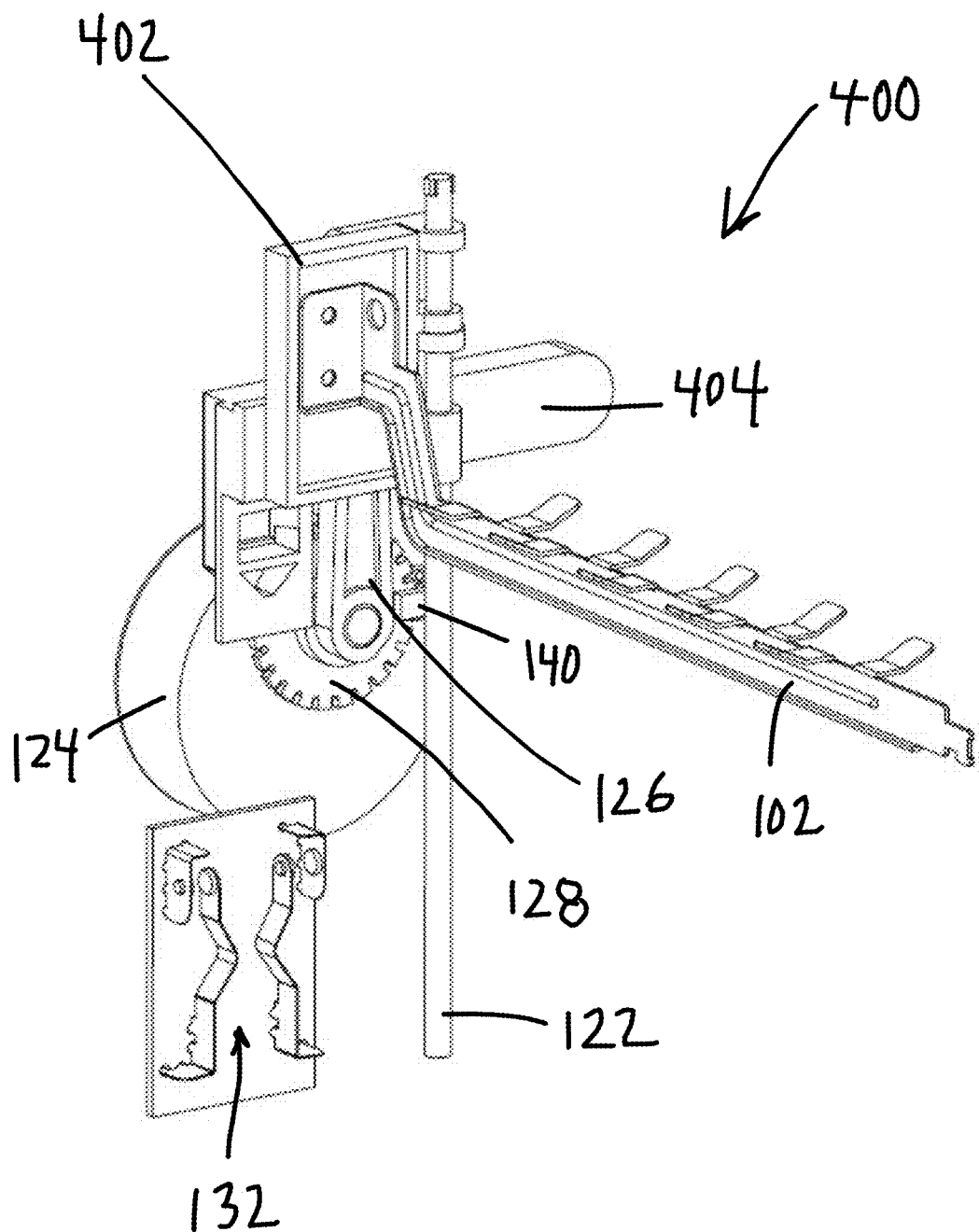
FIG. 24 is a rear, perspective view of a carriage assembly according to another embodiment of the invention.
Figure 25:
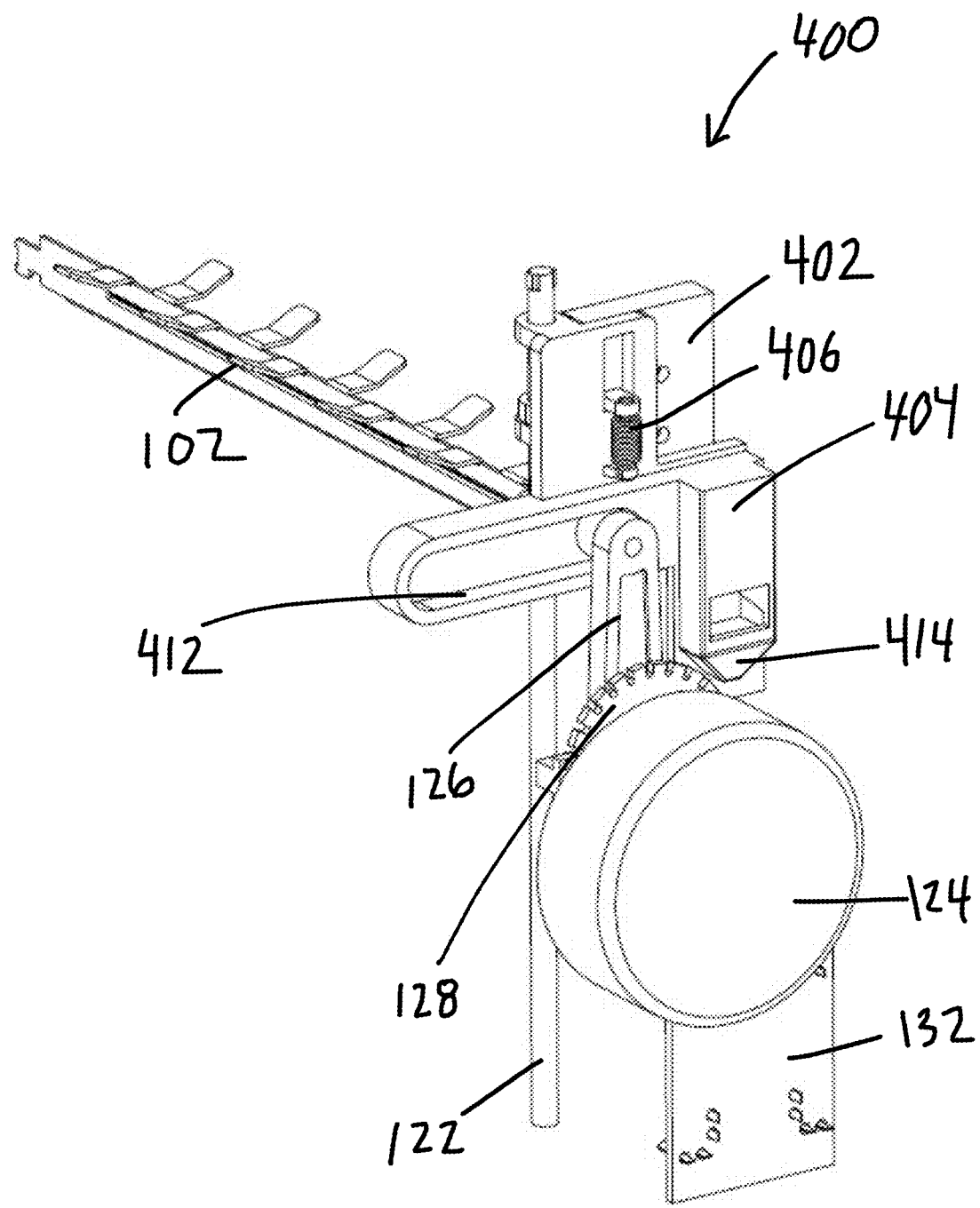
FIG. 25 is a front, perspective view of the carriage assembly of FIG. 24.

As best shown in FIG. 26, the first slider member 402 includes a projection 408 that is received in a corresponding window opening 410 in the second slider member 404. In an embodiment, the components may be reversed such that the second slider member 404 has a projection and the first slider member 402 has a window that receives the projection. The second slider member 404 also includes a horizontally-oriented slot 412 and a switch actuator in the form of a finger 414 laterally positioned with respect to the slot 412. As shown in FIGS. 24-26, the first slider member 402 and second slider member 404 are each slidably connected to a vertically-oriented guide rod 122 which may be considered to form part of the carriage assembly 100 such that each of the first slider member 402 and second slider member 404 are vertically moveable along the guide rod 122. As will be appreciated, the carriage assembly 400 is generally similar to carriage assembly 100, however, the component parts have been simplified so that two slider members are utilized instead of three. In particular, the finger 414 for actuating the leaf spring power switch 132 has now been integrated into the second slider member 404 (and the third slider member omitted). In addition, the electromagnet for engaging a hook lock has also been omitted.

Figure 27:
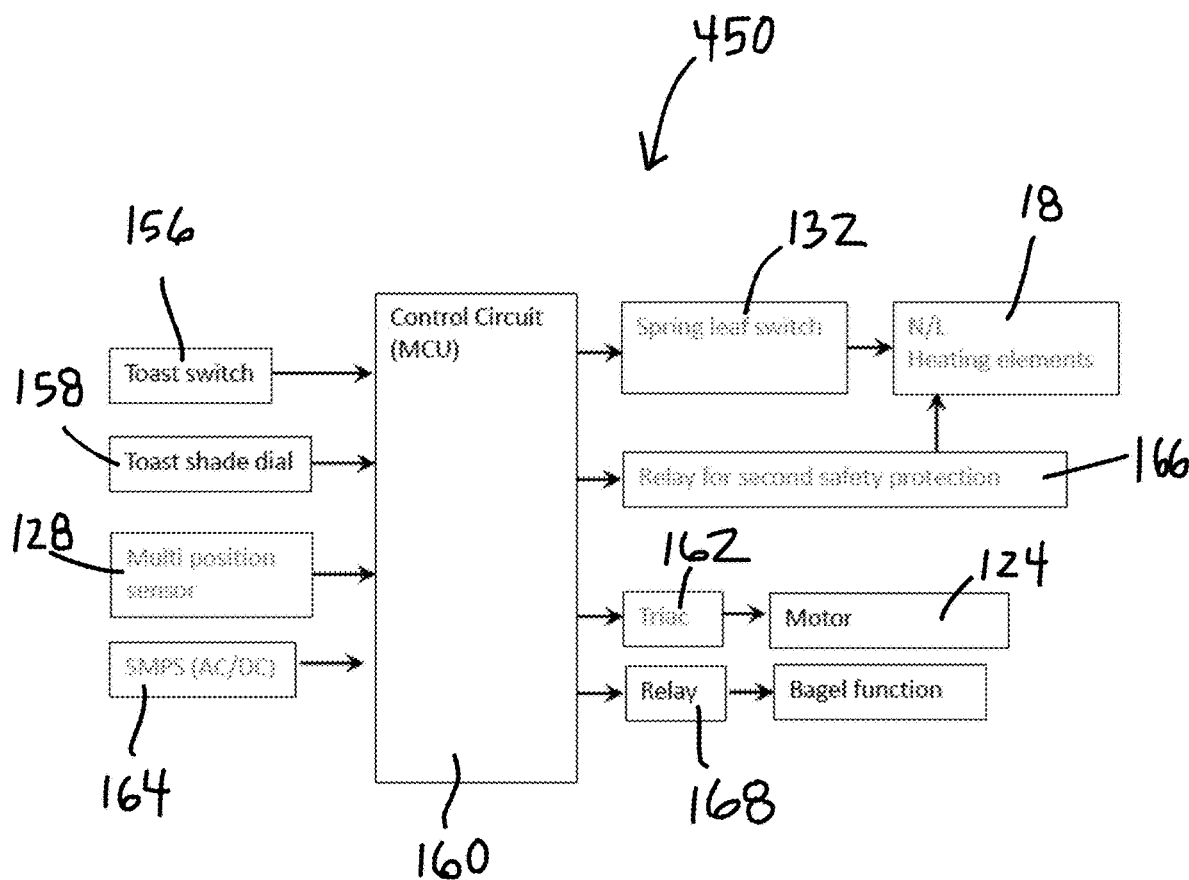
FIG. 27 is a schematic illustration of the control system and control logic of a toaster according to another embodiment of the invention.

With reference to FIG. 27, the control system 450 for a toaster 10 having the carriage assembly 400 is substantially similar to control system 150 of FIG. 6, where like reference numerals designate like parts. Rather than having a leaf spring switch and electromagnet, however, the control system uses only a leaf spring switch 132 to control the heating element 18.

Figure 28:
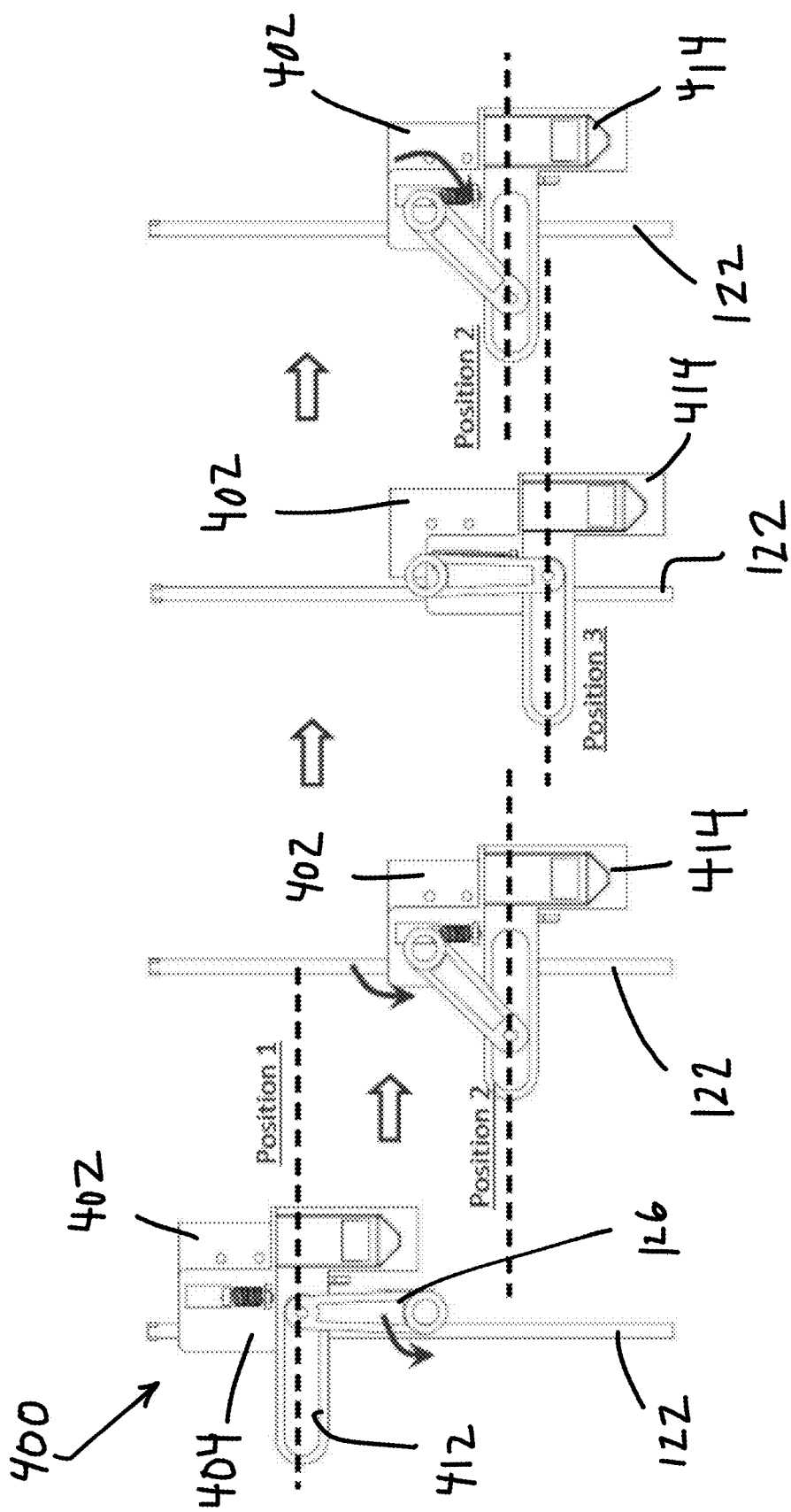
FIG. 28 is a schematic illustration showing operation of the carriage assembly of FIG. 24.
Figure 29:
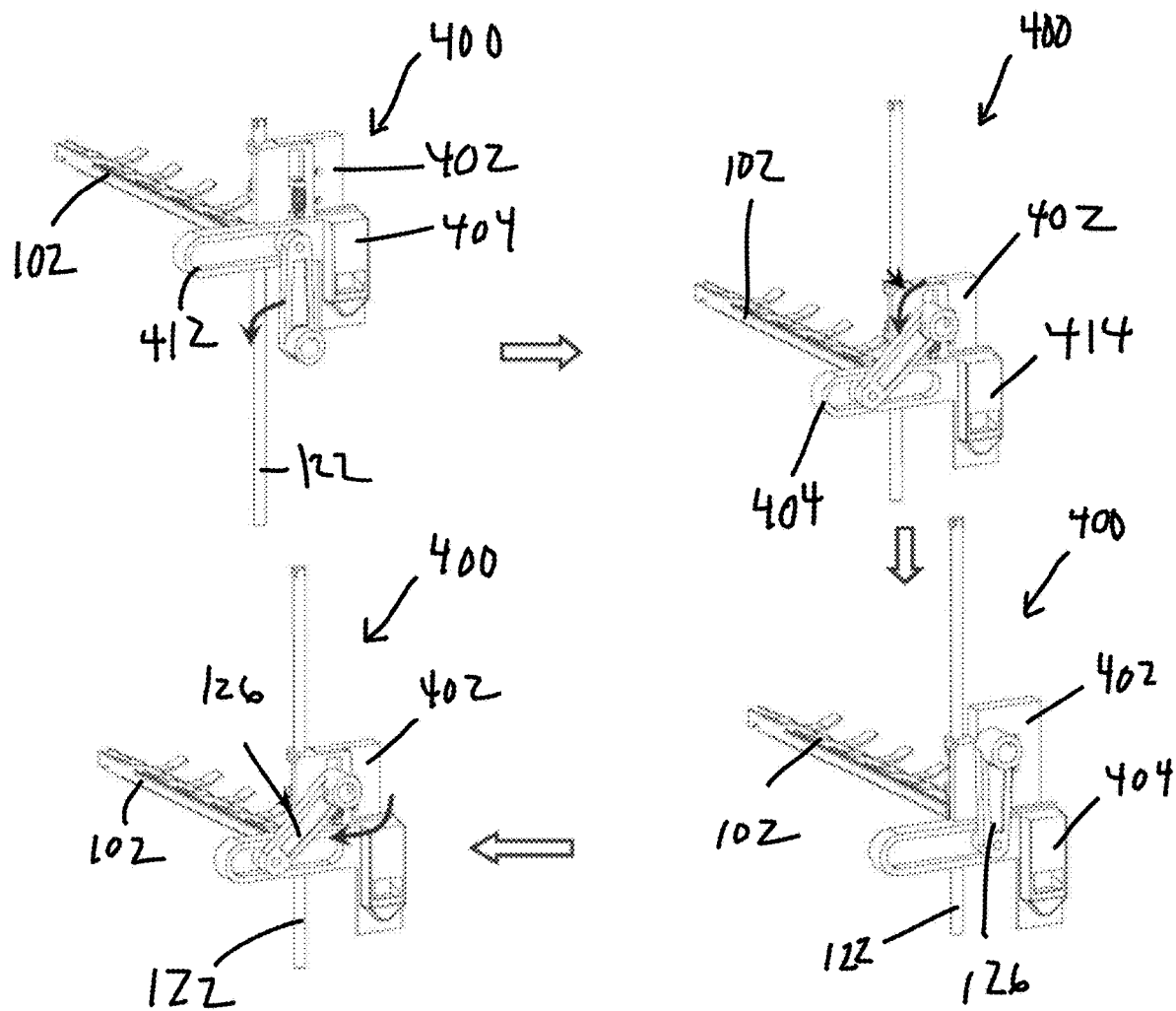
FIG. 29 is a is a perspective view of the carriage assembly of FIG. 24, illustrating operation thereof.

Operation of the carriage assembly 400 will now be described with reference to FIGS. 28 and 29. Upon pressing the toast button/switch 156, the motor 124 drives the second slider member 404 down from Position 1 to Position 2 via the crank 126 received in the slot 412 of the second slider member 404. The second slider member 404 then pulls the first slider member 402 downward via the extension spring 406 which interconnects the first slider member 402 and the second slider member 404. Similar to the embodiments described above, the first slider member 402 and supporting rack 102 stop at Position 2, which is the bottom of the chassis and the proper position for toasting. The second slider member 404 keeps moving downwardly to Position 3 until the finger 414 of the second slider member 404 actuates the leaf spring power switch 132. Upon actuation of the leaf spring power switch 132 by the finger actuator 414, the control unit 160 controls the motor 124 to stop and actuates the heating elements 18 to commence toasting. After toasting, the control unit 160 once again actuates the motor 124, which drives the first slider member 402 and the second slider member 404 upward to Position 1.

Similar to the embodiments described above, if the first slider member 402 is jammed by bread in the supporting rack 102, the motor rotates and pulls the second slider member 404 up to Position 2 to disengage the finger 414 from the leaf spring switch 132 to turn off the leaf spring switch 132. In addition, as noted above, the control system 450 includes a relay 166 for redundant safety protection, which cuts off all the heating elements in the case of mechanism or motor failure.

Figure 30:
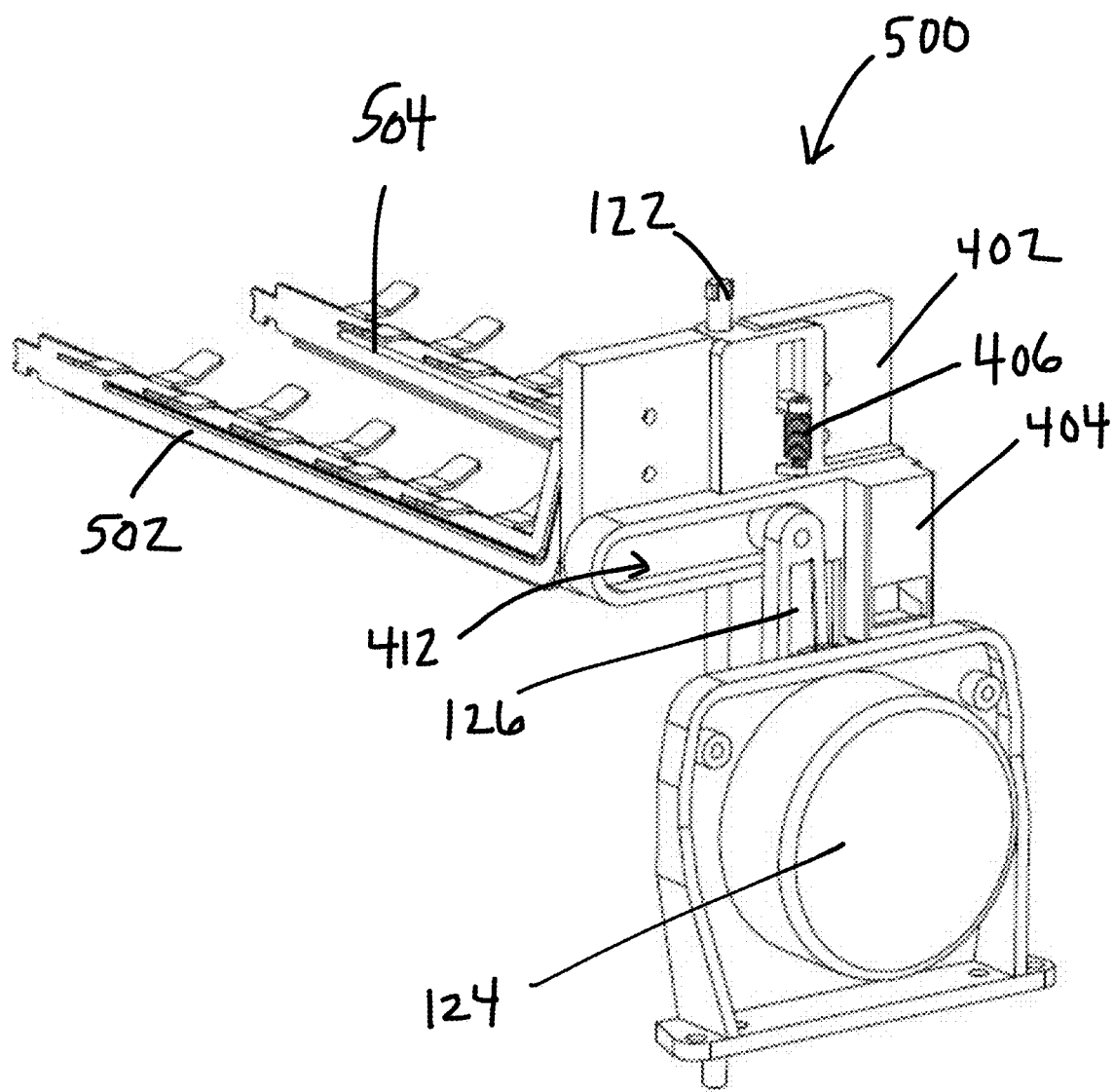
FIG. 30 is front, perspective view of a carriage assembly for a toaster according to another embodiment of the present invention.
Figure 31:
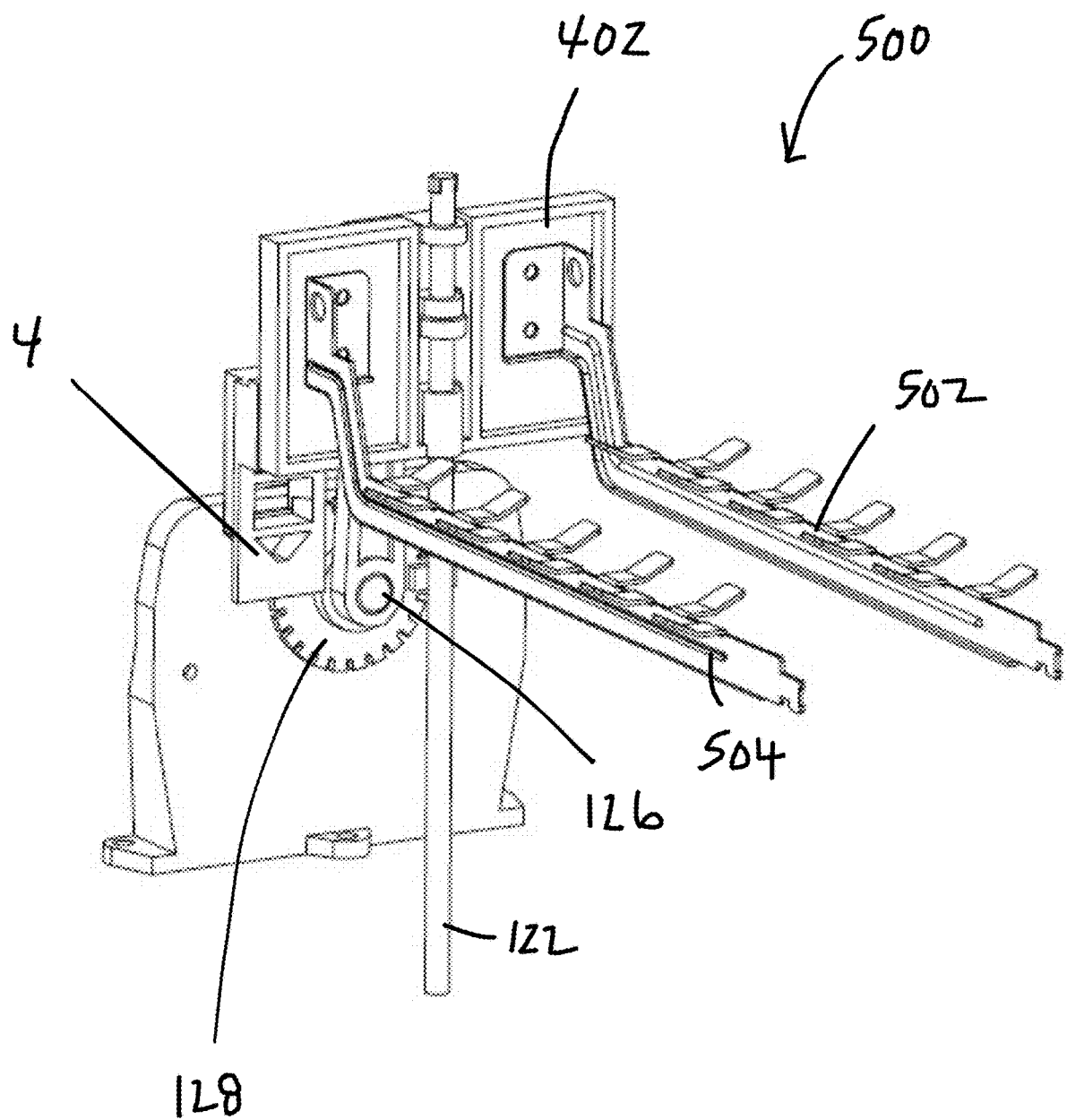
FIG. 31 is a rear, perspective view of the carriage assembly of FIG. 30.
Figure 32:
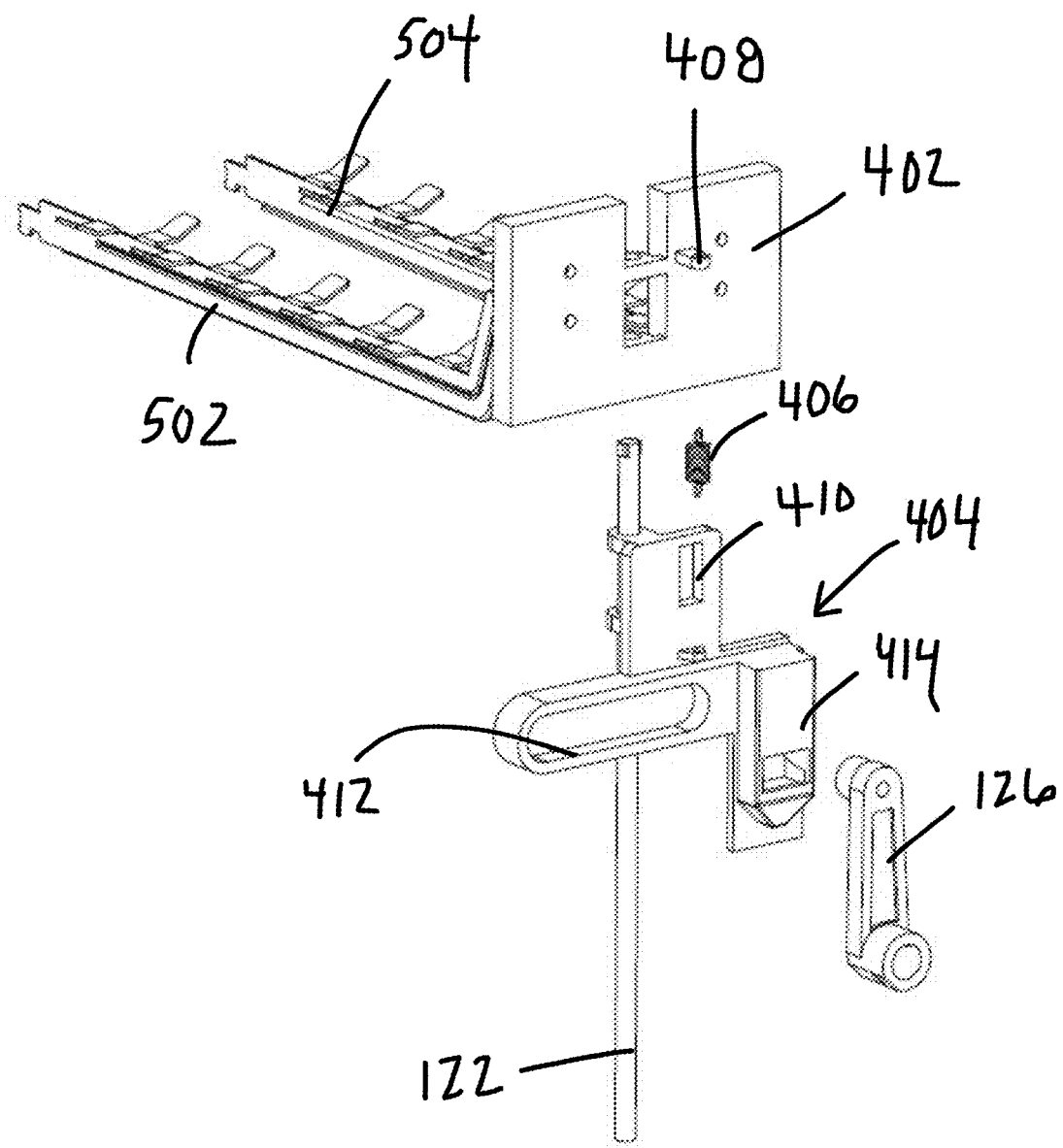
FIG. 32 is an exploded, perspective view of the carriage assembly of FIG. 30.

Turning now to FIGS. 30-32, a carriage assembly 500 according to an alternative embodiment of the present invention is illustrated. The carriage assembly 500 is generally similar in configuration and operation to carriage assembly 400, where like reference numerals designate like parts. As shown therein, however, the carriage assembly 500 includes a pair of supporting racks 502, 504 for support two separate slices of bread or other food items. In particular, each supporting rack 502, 504 may be positioned in a respective slot 14 in the housing 12 and fixedly connected to a single first sliding member 402. In an embodiment, the first sliding member 402 may be made wider so as to allow for the connection of both supporting racks 502, 504. Operation of the carriage assembly 500 as the same described above in connection with carriage assembly 400, however, rather than toasting a single slice of bread, carriage assembly 500 allows for the toasting of two slices of bread simultaneously.

Figure 33:
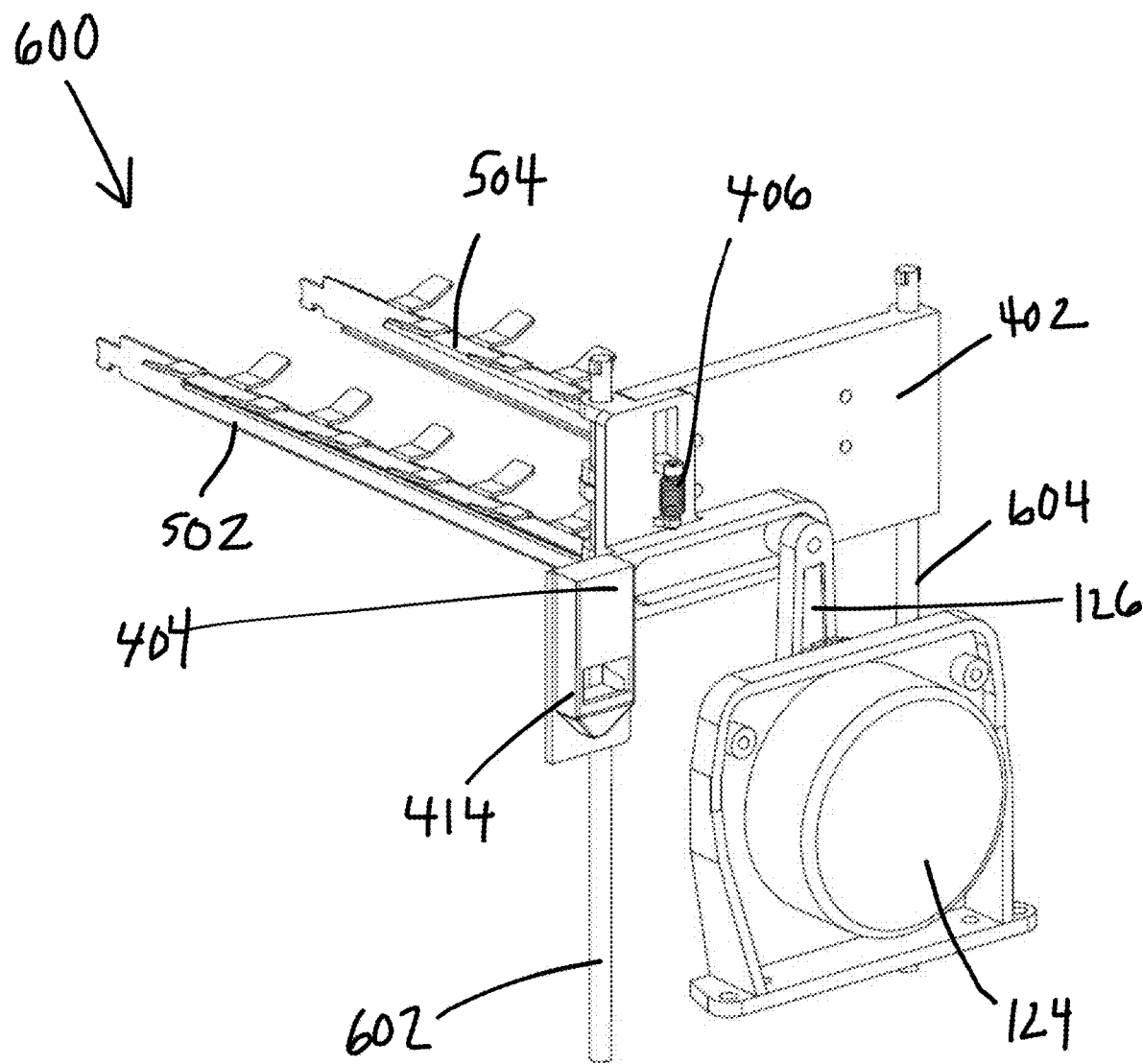
FIG. 33 is front, perspective view of a carriage assembly for a toaster according to another embodiment of the present invention.
Figure 34:
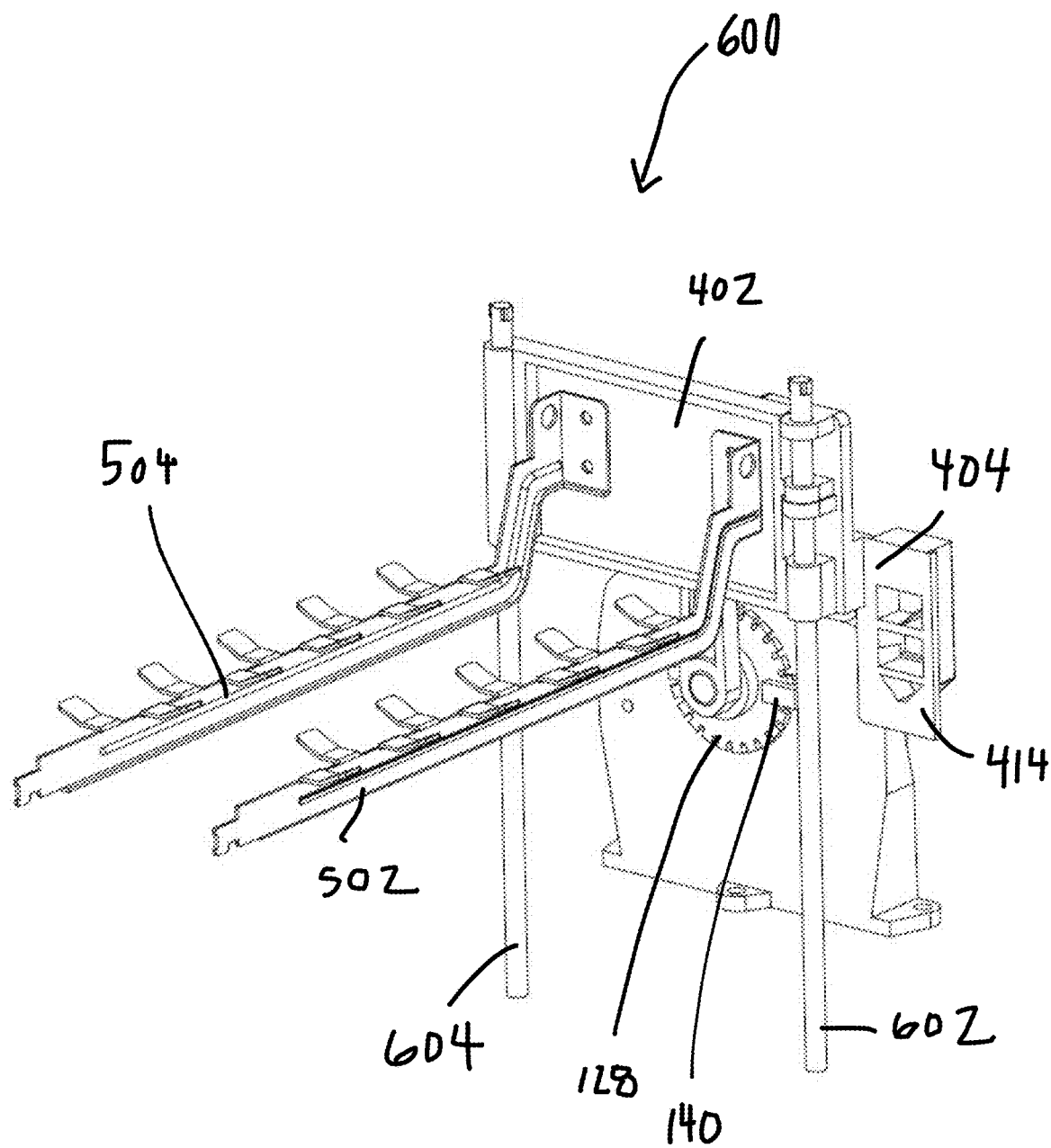
FIG. 34 is a rear, perspective view of the carriage assembly of FIG. 33.
Figure 35:
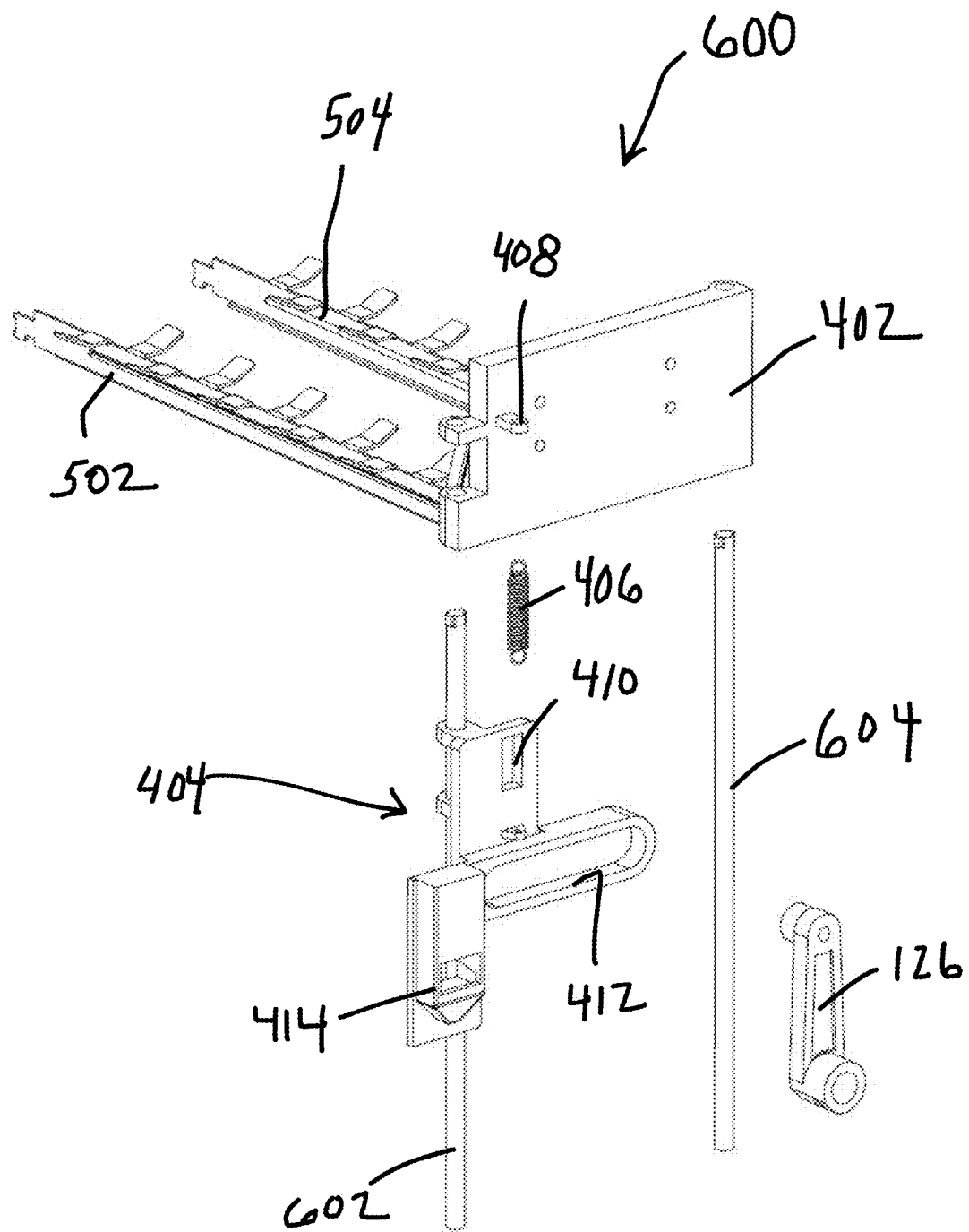
FIG. 35 is an exploded, perspective view of the carriage assembly of FIG. 33.

With reference to FIGS. 33-35, a carriage assembly 600 according to an alternative embodiment of the present invention is illustrated. The carriage assembly 600 is generally similar in configuration and operation to carriage assembly 400 and 500, where like reference numerals designate like parts. As shown therein, the carriage assembly 600 includes a pair of supporting racks 502, 504 for simultaneously toasting or browning two separate food items in respective slots 14 of the toaster 10 in the manner described above (i.e., using a single carriage assembly and motor 124). Rather than the carriage assembly having a single guide rod along which the first and second slider assemblies 402, 404 are slidably mounted, the carriage assembly 600 includes at least two guide rods 602, 604 on which the first and second and third slider assemblies 402, 404 are slidably mounted. As illustrated therein, it is contemplated that various modifications may be made to the first slider assembly 402 and second slider assembly 404 to facilitate mounting of these components to the guide rods 602, 604 and to facilitate operative interconnection between these components to achieve smooth operation of components in the manner described above.

The various embodiments of the present invention described herein therefore provide for a motorized toaster having a control and positioning system that provides for the precise control over food item positioning and toasting, as well as allowing for various food items, regardless of size, to be automatically positioned for ease of removal after a toasting operation. In addition, the toaster and carriage assemblies of the present invention obviate the need to use relays for motor and heater control. Moreover, the toaster of the present invention provides an anti-jam function in the case a food item is jammed in the toaster slot, which automatically cuts power to the heating elements in the event of a jam.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A toaster, comprising:
   a housing having a slot for receiving a food item;
   a heating element associated with the slot for toasting the food item;
   a carriage assembly having a supporting rack movably mounted in the slot for supporting the food item within the slot, a first slider member connected to the supporting rack, and a second slider member operatively connected to the first slider member;
   a motor;
   a driving member having a first end operatively connected to the motor and a second end received in a slot in the second slider member such that when the motor is driven to rotate the driving member, the driving member drives the supporting rack, via the first slider member and the second slider member, to slidably move within the slot;

at least one guide rod vertically positioned within the housing;

wherein the first slider member and the second slider member are slidably connected to the guide rod;

wherein the carriage assembly further includes a third slider member slidably connected to the guide rod;

wherein the second slider member is positioned intermediate the first slider member and the third slider member; and wherein the second slider member and the third slider member are configured such that downward movement of the second slider member imparts a corresponding downward movement of the third slider member.

2. The toaster of claim 1, wherein:
the at least one guide rod is a pair of guide rods;
wherein the first slider member and the second slider member are slidably connected to each guide rod.

3. The toaster of claim 1, wherein:
the housing includes a second slot and;
wherein the carriage assembly includes a second supporting rack movably mounted in the second slot, the second supporting rack being connected to the first slider member; and
wherein when the motor is driven to rotate the driving member, the driving member drives the second supporting rack via the first slider member and the second slider member to slidably move within the second slot.

4. The toaster of claim 1, wherein:
the third slider member includes an actuator member;
wherein the toaster further includes a switch controlling power to the heating element;
wherein the actuator member and the switch are positioned and configured such that when the third slider member is driven downwardly by the second slider member, the actuator member actuates the switch to activate the heating element to initiate a toasting operation.

5. The toaster of claim 4, wherein:
the switch is a leaf spring power switch.

6. The toaster of claim 4, wherein:
the third slider member includes a first engagement member; and
wherein the toaster further includes an electromagnet;
wherein the electromagnet is configured to engage the first engagement member of the third slider member to retain the third engagement member in a toasting position during the toasting operation.

7. The toaster of claim 6, wherein:
the third slider member is connected to the first slider member through at least one extension spring;
wherein the extension spring is placed in a loaded state when the third slider member is moved to the toasting position; and
wherein the extension spring is configured to move the third slider member upward when the first engagement member is disengaged form the electromagnet to deactivate the switch to terminate the toasting operation.

8. The toaster of claim 1, wherein:
the motor is one of a synchronous motor, an AC motor, a DC motor or a brushless motor.

9. The toaster of claim 1, wherein:
the second slider member includes an actuator member;
wherein the toaster further includes a switch controlling power to the heating element;
wherein the actuator member and the switch are positioned and configured such that when the second slider member is driven downwardly by the driving member, the actuator member actuates the switch to activate the heating element to initiate a toasting operation.

10. The toaster of claim 9, wherein:
the second slider member is connected to the first slider member through at least one extension spring;
wherein the extension spring is placed in a loaded state when the second slider member is moved to the toasting position.

11. The toaster of claim 1, further comprising:
a positioning system including at least one position sensor associated with the driving member and/or the motor and a control unit in communication with the position sensor;
wherein the position sensor is configured to sense a position of the driving member and/or the motor.

12. The toaster of claim 11, wherein:
the position sensor is one of a hall sensor and an infrared sensor.

13. The toaster of claim 11, wherein:
the position sensor is one of a plurality of micro switch sensors or a plurality of leaf spring switches; and
wherein the driving member is configured to actuate the plurality of micro switch sensor or the plurality of leaf spring switches, respectively, as the driving member is rotated by the motor to indicate a position of the driving member to the control unit.

14. A toaster, comprising:
a housing having a slot for receiving a food item;
a heating element associated with the slot for toasting the food item;
a carriage assembly having a supporting rack movably mounted in the slot for supporting the food item within the slot, a first slider member connected to the supporting rack, a second slider member operatively connected to the first slider member, and a third slider member operatively connected to the first slider member;
a motor; and
a driving member having a first end operatively connected to the motor and a second end received in a slot in the second slider member such that when the motor is driven to rotate the driving member, the driving member drives the supporting rack, via the first slider member, the second slider member and the third slider member, to slidably move within the slot;
wherein the third slider member includes an actuator member;
wherein the toaster further includes a switch controlling power to the heating element;
wherein the actuator member and the switch are positioned and configured such that when the third slider member is driven downwardly by the second slider member, the actuator member actuates the switch to activate the heating element to initiate a toasting operation.

* * * * *